United States Patent
Owens et al.

(10) Patent No.: US 12,332,716 B1
(45) Date of Patent: Jun. 17, 2025

(54) SYSTEMS AND TECHNIQUES FOR IMPROVING BATTERY LIFE IN AN ELECTROMECHANICAL GUN

(71) Applicant: Biofire Technologies Inc., Broomfield, CO (US)

(72) Inventors: Christopher James Owens, Denver, CO (US); Kai Thorin Kloepfer, Denver, CO (US); Jack Hugo Thiesen, Firestone, CO (US); Karl Fredrick Brakora, Spring Lake, MI (US)

(73) Assignee: Biofire Technologies Inc., Broomfield, CO (US)

( * ) Notice: Subject to any disclaimer, the term of this patent is extended or adjusted under 35 U.S.C. 154(b) by 0 days.

(21) Appl. No.: 18/501,586

(22) Filed: Nov. 3, 2023

Related U.S. Application Data

(63) Continuation of application No. 17/662,936, filed on May 11, 2022, now Pat. No. 11,822,413.

(60) Provisional application No. 63/187,254, filed on May 11, 2021.

(51) Int. Cl.
  *G06F 1/32* (2019.01)
  *G06F 1/3212* (2019.01)
  *G06F 1/3231* (2019.01)
  *G06F 1/3287* (2019.01)

(52) U.S. Cl.
  CPC .......... *G06F 1/3212* (2013.01); *G06F 1/3231* (2013.01); *G06F 1/3287* (2013.01)

(58) Field of Classification Search
  CPC ..... G06F 1/3212; G06F 1/3231; G06F 1/3287
  See application file for complete search history.

(56) References Cited

U.S. PATENT DOCUMENTS

| 6,321,478 B1 * | 11/2001 | Klebes | F41A 19/58 42/70.11 |
| 10,036,608 B2 | 7/2018 | Hunt | |
| 2005/0188583 A1 * | 9/2005 | Jackson | F41A 17/08 42/70.11 |

(Continued)

OTHER PUBLICATIONS

Real-time clock, Wikipedia, retrieved from the internet at <http://web.archive.org/web/20201210040535/https://en.wikipedia.org/wiki/Real-time_clock> (Year: 2020).*

*Primary Examiner* — Stefan Stoynov
(74) *Attorney, Agent, or Firm* — Perkins Coie LLP; Andrew T. Pettit

(57) ABSTRACT

The present disclosure provides systems and techniques for reducing power consumption at an electromechanical gun. The electromechanical gun may transition to an inactive state to reduce power consumption, and the electromechanical gun may transition to an active state to perform a system check procedure or to allow a projectile to be fired from the electromechanical gun. The electromechanical gun may identify a sleep event based on an analysis of an output of a first electronic component, compute an estimated time duration based on an amount of electric charge remaining in the energy store, set a sleep timer according to the estimated time duration, and transition to the inactive state by terminating a power supply of a second electronic component. The electromechanical gun may transition to the active state in response to the sleep timer elapsing or a second output indicating that a user is touching the electromechanical gun.

18 Claims, 13 Drawing Sheets

(56) References Cited

U.S. PATENT DOCUMENTS

| | | | | |
|---|---|---|---|---|
| 2011/0210709 A1* | 9/2011 | Mounier | ................ | H02J 9/005 |
| | | | | 323/271 |
| 2012/0131367 A1* | 5/2012 | Kamijima | ............. | G06F 1/3212 |
| | | | | 713/323 |
| 2015/0377574 A1 | 12/2015 | Cooke et al. | | |
| 2019/0187776 A1* | 6/2019 | Mukherjee | ............ | G06F 1/3203 |

* cited by examiner

SYSTEMS AND TECHNIQUES FOR IMPROVING BATTERY LIFE IN AN ELECTROMECHANICAL GUN

CROSS-REFERENCE TO RELATED APPLICATIONS

This application is a continuation of U.S. application Ser. No. 17/662,936, titled "SYSTEMS AND TECHNIQUES FOR IMPROVING BATTERY LIFE IN AN ELECTROMECHANICAL GUN" and filed May 11, 2022, which claims priority to U.S. Provisional Application No. 63/187,254, titled "TECHNIQUES FOR IMPROVING BATTERY LIFE IN AN ELECTROMECHANICAL GUN" and filed on May 11, 2021, which are incorporated by reference herein in their entireties.

FIELD OF TECHNOLOGY

The teachings disclosed herein generally relate to guns, and more specifically to electromechanical guns.

BACKGROUND

The term "gun" generally refers to a ranged weapon that uses a shooting tube (also referred to as a "barrel") to launch solid projectiles, though some instead project pressurized liquid, gas, or even charged particles. These projectiles may be free flying (e.g., as with bullets), or these projectiles may be tethered to the gun (e.g., as with spearguns, harpoon guns, and electroshock weapons such as TASER® devices). The means of projectile propulsion vary according to the design (and thus, type of gun), but are traditionally effected pneumatically by a highly compressed gas contained within the barrel. This gas is normally produced through the rapid exothermic combustion of propellants (e.g., as with firearms) or mechanical compression (e.g., as with air guns). When introduced behind the projectile, the gas pushes and accelerates the projectile down the length of the barrel, imparting sufficient launch velocity to sustain it further towards a target after exiting the muzzle.

Most guns use compressed gas that is confined by the barrel to propel the projectile up to high speed, though the term "gun" may be used more broadly in relation to devices that operate in other ways. Accordingly, the term "gun" may not only cover handguns, shotguns, rifles, single-shot firearms, semi-automatic firearms, and automatic firearms, but also electroshock weapons, light-gas guns, plasma guns, and the like.

Significant energies have been spent developing safer ways to use, transport, store, and discard guns. Gun safety is an important aspect of avoiding unintentional injury due to mishaps like accidental discharges and malfunctions. Gun safety is also becoming an increasingly important aspect of designing and manufacturing guns. While there have been many attempts to make guns safer to use, transport, and store, those attempts have had little impact.

SUMMARY

The systems, apparatuses, and techniques described herein support transitioning between an active state and an inactive state. The term "gun," as used herein, may be used to refer to a lethal force weapon, such as a pistol, a rifle, a shotgun, a semi-automatic firearm, or an automatic firearm; a less-lethal weapon, such as a stun-gun or a projectile emitting device; or an assembly of components operable to selectively discharge matter or charged particles, such as a fire control system.

Generally, the described systems and techniques described herein provide for reducing power consumption at a gun, such as an electromechanical gun. For example, the gun may transition to an inactive state to reduce power consumption, and the gun may transition to an active state to fire a projectile or to perform a system check procedure. The gun may identify a sleep event based on an analysis of an output of a first electronic component, compute an estimated time duration based on an amount of electric charge remaining in an energy store, set a sleep timer according to the estimated time duration, and transition to the inactive state by terminating a power supply of a second electronic component. The gun may transition to the active state in response to the sleep timer elapsing or in response to a second output indicating that a user is touching the gun. For example, the gun may analyze the second output, determine that the second output satisfies a threshold, and transition to the active state in response to determining that the second output satisfies the threshold.

Figure 1:
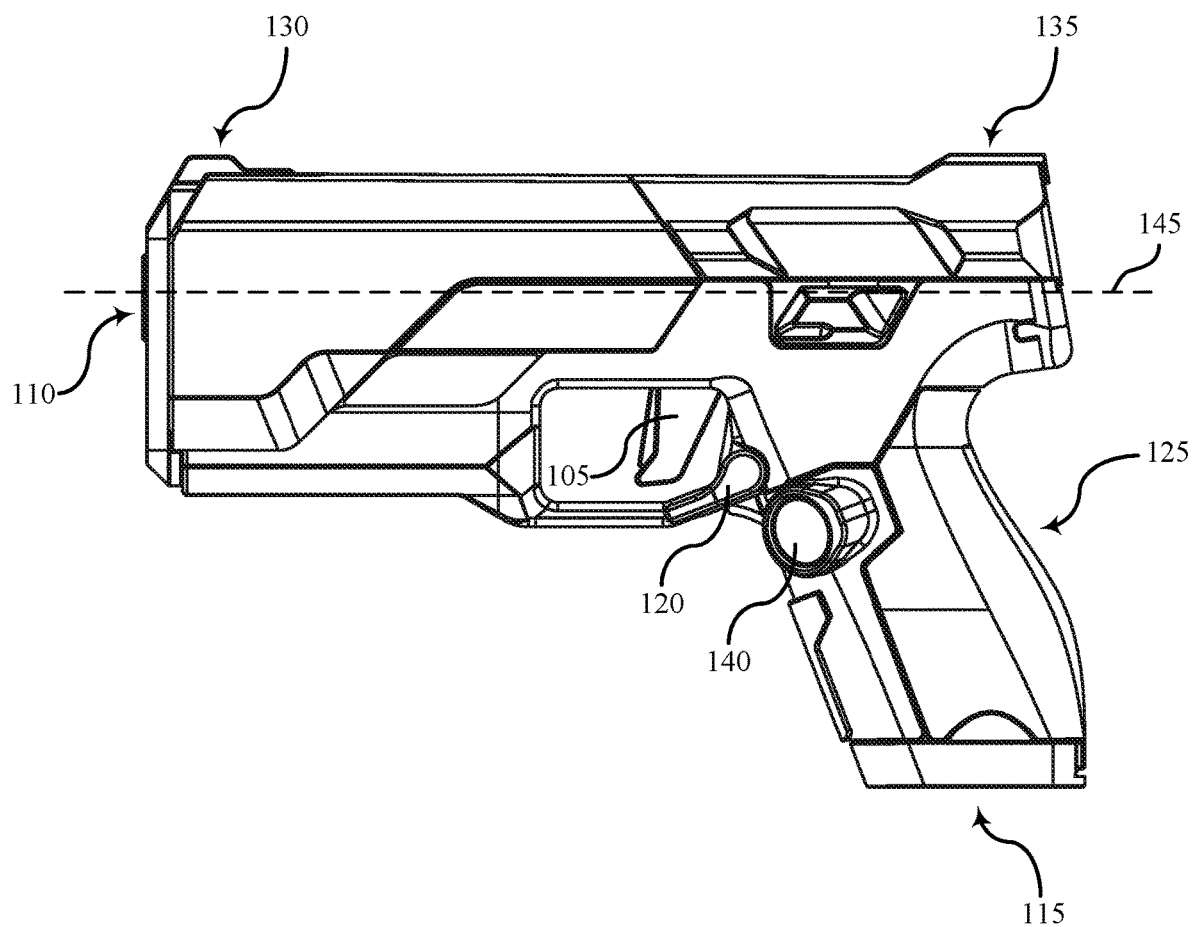
FIG. 1 illustrates an example of a gun that is capable of transitioning between an active state and an inactive state.

Various features of the technology described herein will become more apparent to those skilled in the art from a study of the Detailed Description in conjunction with the drawings. Various embodiments are depicted in the drawings for the purpose of illustration. However, those skilled in the art will recognize that alternative embodiments may be employed without departing from the principles of the technology. Accordingly, the technology is amenable to modifications that may not be reflected in the drawings.

DETAILED DESCRIPTION

Some conventional guns include electronic components that function at low levels of power (e.g., 100 microwatts (μW), 1,000 μW, etc.) or for short periods of time (e.g., five minutes, one hour, four hours, etc.). For example, some guns include button cell batteries (also called "coin cell batteries") that are commonly used in watches. A button cell battery can be used to power an electronic component that functions at a low level of power, such as a light-emitting diode (LED) or an integrated circuit. But such batteries fail to meet the power demands of electronic components that function at higher levels of power (e.g., 1,000 milliwatts (mW), 2 Watts (W), 5 W etc.), such as a processor or an electronic fire control system.

Embedding a large capacity battery (e.g., 200 milliamp-hours (mAh), 1,000 mAh, etc.) into a conventional gun can diminish the ergonomics of the gun and result in a high quiescent current that quickly depletes the charge stored in the battery. In such scenarios, a user may need to charge the battery frequency (e.g., hourly or daily) to maintain the gun in a useable state. However, charging a battery on a frequent basis imposes many charge and discharge cycles on the battery, which can reduce the longevity of the battery. For example, the frequent charge and discharge cycles can reduce the capacity of the battery over time. Conventional gun designs therefore inhibit the use of electronic components that function on high levels of power, such as a flashlight, a processor, or an electronic fire control system. Having to replace or recharge a battery on a frequent basis can render the electronic components of the gun, or the gun itself, nonfunctional. As such, systems and techniques for improving battery life in a gun is desired.

Introduced here, therefore, are systems and techniques for improving battery life in an electromechanical gun. An electromechanical gun may transition to an inactive state (e.g., a low-power state, a sleep state, etc.) based on a user absence event or a user input. In other words, the electromechanical gun may transition to the inactive state in response to an operator (also referred to as a "user") pressing a button or in response to a determination that no handling of the electromechanical gun has occurred within a predetermined amount of time, so as to reduce the consumption of power. The electromechanical gun may set a sleep timer, transition to the inactive state, and transition to an active state (e.g., a high-power state, a wake state, etc.) when the timer expires. While in the inactive state, the electromechanical gun consumes less power than while in the active state, thereby increasing the amount of time the electromechanical gun can function on a single charge and extending the longevity of the battery.

The electromechanical gun may transition from the inactive state to the active state based on expiration of the sleep timer, a user presence event, or a user input. Examples of user presence events include a user touching the gun, a user picking up the gun, and a user aiming the gun. The electromechanical gun may identify the user presence event based on an analysis of an output produced by a presence sensor (e.g., a proximity sensor, a biometric sensor, an accelerometer, etc.) that indicates that the presence sensor is active, and the gun may transition to the active state based on the output indicating that the presence sensor is active. The electromechanical gun may include a clock (e.g., a real-time clock (RTC)) that measures the passage of time and an alarm that is capable of generating an output when a predetermined amount of time elapses. The electromechanical gun may set the sleep timer for the predetermined amount of time, maintain the sleep timer using the clock, and transition to the active state based on the alarm generating the output indicating expiration of the sleep timer. The presence sensor and the clock may function at low levels of power (e.g., 100 nanowatts (nW), 200 μW, etc.) so as to allow the electromechanical gun to operate at a low level of power consumption while in the inactive state, and the outputs generated by the presence sensor and/or alarm provide a means for indicating that the gun is to transition to from the inactive state to the active state. The electromechanical gun may transition from the inactive state to the active state based on expiration of the sleep timer, or the electromechanical gun may transition from the inactive state to the active state based on a user presence event, which may occur prior to expiration of the sleep timer.

The electromechanical gun may transition from the active state to the inactive state based on a user input or a user absence event, such as a user releasing the gun. The electromechanical gun may transition from the active state to the inactive state based on a presence sensor generating an output indicating that the sensor is inactive, based on a presence sensor not generating an output, or based on expiration of a standby timer. The electromechanical gun may identify the user absence event based on a presence sensor generating an output indicating that the sensor is inactivate, and the gun may transition to the inactive state based on the output indicating that the sensor is inactivate. In some examples, the gun may transition to the inactive state based on the user absence event and expiration of the standby timer. For example, the gun may identify a user absence event based on a presence sensor generating an output, initiate a standby timer based on the user absence event, identify expiration of the standby time, and transition to the inactive state based on the user absence event and the expiration of the standby timer. The gun may determine an amount of electric charge remaining in an energy store (e.g., a battery, a capacitor, etc.), set a sleep timer based on the amount of electric charge remaining such that the sleep timer will expire prior to consumption of the remaining electric charge, and transition to the inactive state. While in the inactive state one or more low power components may remain active so as to allow the gun to quickly transition back to the active state. For example, a presence sensor may remain in an active state so as to allow the gun to identify user presence events, and the clock may stay active so as to allow the gun to identify expiration of the sleep timer Embodiments may be described in the context of executable instructions for the purpose of illustration. For example, a processor housed in a gun may be described as being capable of executing instructions that permit the processor to detect a sleep event (e.g., a user absence event or a user input event) and cause the gun to transition to an inactive state in response to detecting the sleep event. The processor housed in the gun may also be described as being capable of executing instructions that permit the processor to detect a wake event (e.g., a user presence event, a user input event, or expiration of a sleep timer) and cause the gun to transition to an active state in response to detecting the wake event. However, those skilled in the art will recognize that aspects of the technology could be implemented via hardware, firmware, or software.

Terminology

References in the present disclosure to "an embodiment" or "some embodiments" means that the feature, function, structure, or characteristic being described is included in at least one embodiment. Occurrences of such phrases do not necessarily refer to the same embodiment, nor do they necessarily refer to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. For example, the phrase "A is based on B" does not imply that "A" is based solely on "B." Thus, the term "based on" is intended to mean "based at least in part on" unless otherwise noted.

The terms "connected," "coupled," and variants thereof are intended to include any connection or coupling between two or more elements, either direct or indirect. The connection or coupling can be physical, electrical, logical, or a combination thereof. For example, elements may be electrically or communicatively coupled with one another despite not sharing a physical connection. As one illustrative example, a first component is considered coupled with a second component when there is a conductive path between the first component and the second component. As another illustrative example, a first component is considered coupled with a second component when the first component and the second component are fastened, joined, attached, tethered, bonded, or otherwise linked.

The term "manager" may refer broadly to software, firmware, or hardware. Managers are typically functional components that generate one or more outputs based on one or more inputs. A computer program may include or utilize one or more managers. For example, a computer program may utilize multiple managers that are responsible for completing different tasks, or a computer program may utilize a single manager that is responsible for completing all tasks. As another example, a manager may include an electrical circuit that produces an output based on hardware components, such as transistors, logic gates, analog components, or digital components. Unless otherwise noted, the terms "manager" and "module" may be used interchangeably herein.

When used in reference to a list of multiple items, the term "or" is intended to cover all of the following interpretations: any of the items in the list, all of the items in the list, and any combination of items in the list. For example, the list "A, B, or C" indicates the list "A" or "B" or "C" or "A and B" or "A and C" or "B and C" or "A and B and C."

Overview of Guns

FIG. 1 illustrates an example of a gun 100 that is capable of transitioning between an active state and an inactive state in accordance with aspects of the present disclosure. An active state may correspond to a high-power state or a wake state, an inactive state may correspond to a low-power state or a sleep state, and transitioning to the inactive state may reduce the power consumed by the gun 100. The gun 100 includes a trigger 105, a barrel 110, a magazine 115, and a magazine release 120. While these components are generally found in firearms, such as pistols, rifles, and shotguns, those skilled in the art will recognize that the technology described herein may be similarly applicable to other types of guns as discussed above. As an example, comparable components may be included in vehicle-mounted weapons that are not intended to be held or operated by hand. While not shown in FIG. 1, the gun 100 may also include a striker (e.g., a ratcheting striker or rotating striker) or a hammer that can be actuated in response to pulling the trigger 105. Pulling the trigger 105 may result in the release of the striker or hammer, thereby causing the striker or hammer to contact a firing pin, percussion cap, or primer, so as to ignite a propellant and fire a projectile through the barrel 110. Embodiments of the gun 100 may also include a blowback system, a locked breech system, or any combination thereof. These systems are more commonly found in self-reloading firearms. The blowback system may be responsible for obtaining energy from the motion of the case of the projectile as it is pushed to the rear of the gun 100 by expanding propellant, while the locked breech system may be responsible for slowing down the opening of the breech of a self-reloading firearm when fired. Accordingly, the gun 100 may support the semi-automatic firing of projectiles, the automatic firing of projectiles, or both.

The gun 100 may include one or more safeties that are meant to reduce the likelihood of an accidental discharge or an unauthorized use. The gun 100 may include one or more mechanical safeties, such as a trigger safety or a firing pin safety. The trigger safety may be incorporated in the trigger 105 to prevent the trigger 105 from moving in response to lateral forces placed on the trigger 105 or dropping the gun. The term "lateral forces," as used herein, may refer to a force that is substantially orthogonal to a central axis 145 that extends along the barrel 110 from the front to the rear of the gun 100. The firing pin safety may block the displacement path of the firing pin until the trigger 105 is pulled. Additionally or alternatively, the gun 100 may include one or more electronic safety components, such as an electronically actuated drop safety. In some cases, the gun 100 may include both mechanical and electronic safeties to reduce the potential for an accidental discharge and enhance the overall safety of the gun 100.

The gun 100 may include one or more sensors, such as a user presence sensor 125 and a biometric sensor 140. In some cases, the gun 100 may include multiple user presence sensors 125 whose outputs can collectively be used to detect the presence of a user. For example, the gun 100 may include a time of flight (TOF) sensor, a photoelectric sensor, a capacitive sensor, an inductive sensor, a force sensor, a resistive sensor, or a mechanical switch. As another example, the gun 100 may include a proximity sensor that is configured to emit an electromagnetic field or electromagnetic radiation, like infrared, and looks for changes in the field or return signal. As another example, the gun 100 may include an inertial measurement unit (IMU) configured to identify a presence event in response to measuring movement that matches a movement signature of a user picking up the gun 100. As another example, the gun 100 may include an audio input mechanism (e.g., a transducer implemented in a microphone) that is configured to generate a signal that is representative of nearby sounds, and the presence of the user can be detected based on an analysis of the signal.

The gun 100 may also include one or more biometric sensors 140 as shown in FIG. 1. For example, the gun 100 may include a fingerprint sensor (also referred to as a "fingerprint scanner"), an image sensor, or an audio input mechanism. The fingerprint scanner may generate a digital image (or simply "image") of the fingerprint pattern of the user, and the fingerprint pattern can be examined (e.g., on the gun 100 or elsewhere) to determine whether the user should be verified. The image sensor may generate an image of an anatomical feature (e.g., the face or eye) of the user, and the image can be examined (e.g., on the gun 100 or elsewhere) to determine whether the user should be verified. Normally, the image sensor is a charge-coupled device (CCD) or complementary metal-oxide semiconductor (CMOS) sensor that is included in a camera module (or simply "camera") able to generate color images. The image sensor need not necessarily generate images in color, however. In some embodiments, the image sensor is configured to generate ultraviolet, infrared, or near infrared images. Regardless of its nature, images generated by the image sensor can be used to authenticate the presence or identity of the user. As an example, an image generated by a camera may be used to perform facial recognition of the user. The audio input mechanism may generate a signal that is representative of audio containing the voice of the user, and the signal can be examined (e.g., on the gun 100 or elsewhere) to determine whether the user should be verified. Thus, the signal generated by the audio input mechanism may be used to perform speaker recognition of the user. Including multiple biometric sensors in the gun 100 may support a robust authentication procedure that functions in the event of sensor failure, thereby improving gun reliability. Note, however, that each of the multiple biometric sensors may not provide the same degree or confidence of identity verification. As an example, the output produced by one biometric sensor (e.g., an audio input mechanism) may be used to determine whether a user is present while the output produced by another biometric sensor (e.g., a fingerprint scanner or image sensor) may be used to verify the identity of the user in response to a determination that the user is present.

The gun 100 may include one or more components that facilitate the collection and processing of token data. For example, the gun 100 may include an integrated circuit (also referred to as a "chip") that facilitates wireless communication. The chip may be capable of receiving a digital identifier, such as a Bluetooth® token or a Near Field Communication (NFC) identifier. The term "authentication data" may be used to described data that is used to authenticate a user. For example, the gun 100 may collect authentication data from the user to determine that the user is authorized to operate the gun 100, and the gun 100 may be unlocked in based on determining that the user is authorized to operate the gun 100. Authentication data may include biometric data, token data, or both. Authentication data may be referred to as enrollment data when used to enroll a user, and authentication data may be referred to as query data when used to authenticate a user. In some examples, the gun may transform (e.g., encrypt, hash, transform, encode, etc.) enrollment data and store the transformed enrollment data in memory (e.g., non-volatile memory) of the gun, and the gun may discard or refrain from storing query data in the memory. Thus, the gun 100 may transform authentication data, so as to inhibit unauthenticated use even in the event of unauthorized access of the gun.

The gun 100 may support various types of aiming sights (or simply "sights"). At a high level, a sight is an aiming device that may be used to assist in visually aligning the gun 100 (and, more specifically, its barrel 110) with a target. For example, the gun 100 may include iron sights that improve aim without the use of optics. Additionally or alternatively, the gun 100 may include telescopic sights, reflex sights, or laser sights. In FIG. 1, the gun 100 includes two sights—namely, a front sight 130 and a rear sight 135. In some cases, the front sight 130 or the rear sight 135 may be used to indicate gun state information. For example, the front sight 130 may include a single illuminant that is able to emit light of different colors to indicate different gun states. As another example, the front sight 130 may include multiple illuminants, each of which is able to emit light of a different color, that collectively are able to indicate different gun states. One example of an illuminant is an LED.

The gun 100 may fire projectiles, and the projectiles may be associated with lethal force or less-lethal force. For example, the gun 100 may fire projectiles containing lead, brass, copper, zinc, steel, plastic, rubber, synthetic polymers (e.g., nylon), or a combination thereof. In some examples, the gun 100 is configured to fire lethal bullets containing lead, while in other cases the gun 100 is configured to fire less-lethal bullets containing rubber. As mentioned above, the technology described herein may also be used in the context of a gun that fires prongs (also referred to as "darts") which are intended to contact or puncture the skin of a target and then carry electric current into the body of the target. These guns are commonly referred to as "electronic control weapons" or "electroshock weapons." One example of an electroshock weapon is a TASER device.

The gun 100 the gun may transition to an inactive state to reduce power consumption, and the gun 100 may transition to an active state to perform a system check procedure or to allow a projectile to be fired from the barrel 110. The gun 100 may identify a sleep event based on an analysis of an output of a first electronic component, compute an estimated time duration based on an amount of electric charge remaining in the energy store, set a sleep timer according to the estimated time duration, and transition to the inactive state by terminating a power supply of a second electronic component. The gun 100 may transition to the active state in response to the sleep timer elapsing or in response to a second output indicating that a user is touching the gun 100. In some examples, the first output and/or the second output may be generated by the user presence sensor 125.

Figure 2:
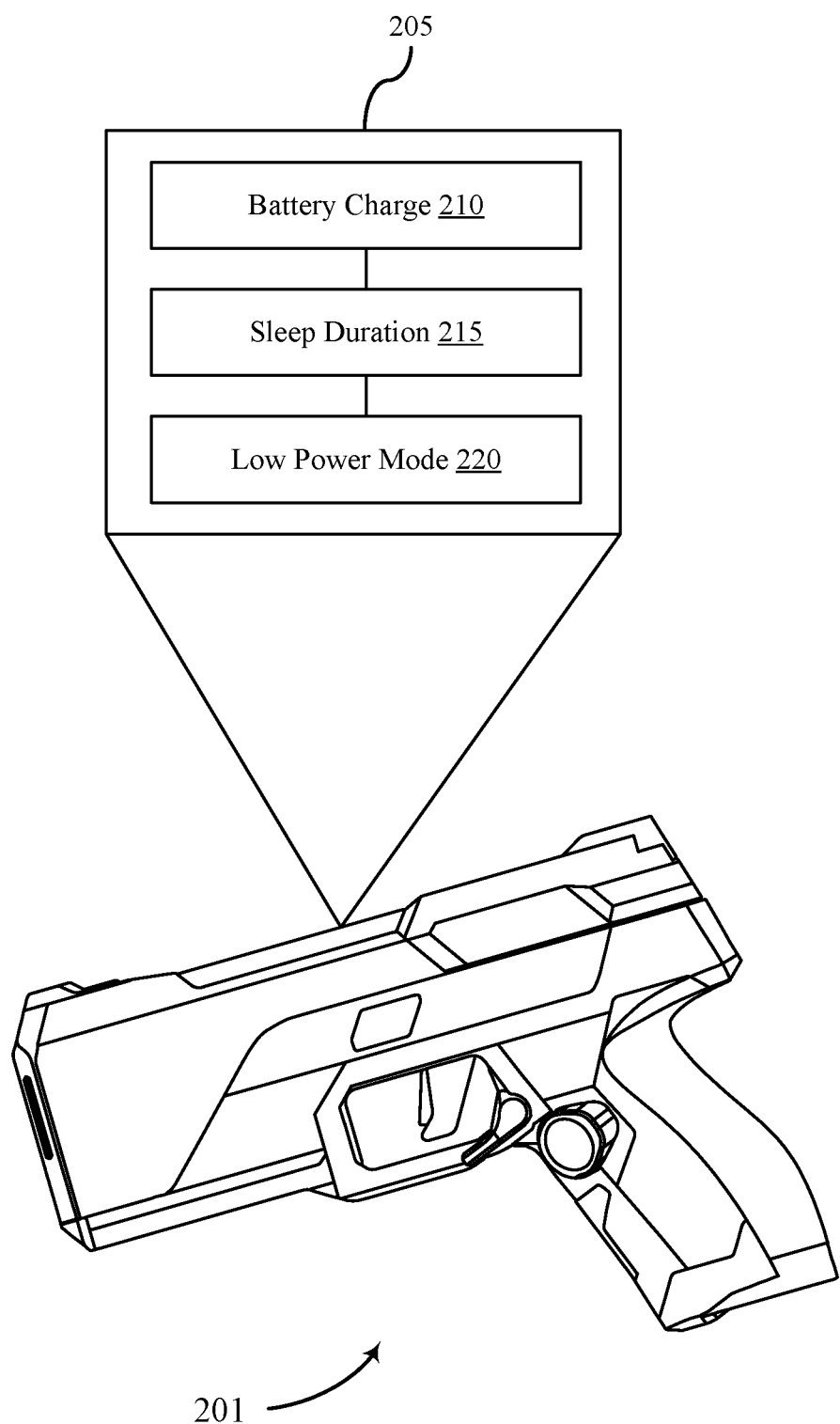
FIG. 2 illustrates an example of a gun that is capable of transitioning to an inactive state.

FIG. 2 illustrates an example of a gun 201 that is capable of transitioning to an inactive state. The gun 201 may transition from an active state to the inactive state in response to a sleep event. The gun 201 may include an energy store (e.g., a battery, a capacitor, etc.), and the longevity of the energy store may be extended based on the gun 201 assuming the inactive state.

The procedure 205 is an example of a procedure for transitioning from an active state (e.g., a high-power state, a wake state, etc.) to an inactive state (e.g., a low-power state, a sleep state, etc.). The gun 201 may consume less power while in the inactive state as compared to while in the active state, so transitioning to the inactive state allows the gun 201 to conserve energy and extend the time for which the energy store can power the gun 201.

The gun 201 may identify a sleep event indicating that the gun 201 is to transition to an inactive state and perform the procedure 205 in response to identifying the sleep event. At step 210, the gun 201 may determine an amount of electric charge remaining in the energy store. At step 215, the gun 201 may compute an estimated time duration based on the amount of electric charge remaining in the energy store, and the estimated time duration may be designed to be an upper limit for the amount of time the gun 201 is permitted to continuously assume the inactive state. At step 220, the gun 201 may transition to an inactive state by terminating a power supply to an electronic component of the gun 201, such as a memory cell, a processor core, an electronic aiming sight, or the like.

The power consumed by the gun 201 while in the inactive state may be less than the power consumed by the gun 201 while in the active state. As such, assuming the inactive state may allow the gun 201 to function for a longer period of time on a single charge as compared to continuously assuming an active state, thereby extending the longevity of the energy store and improving the usability of the gun 201.

Figure 3:
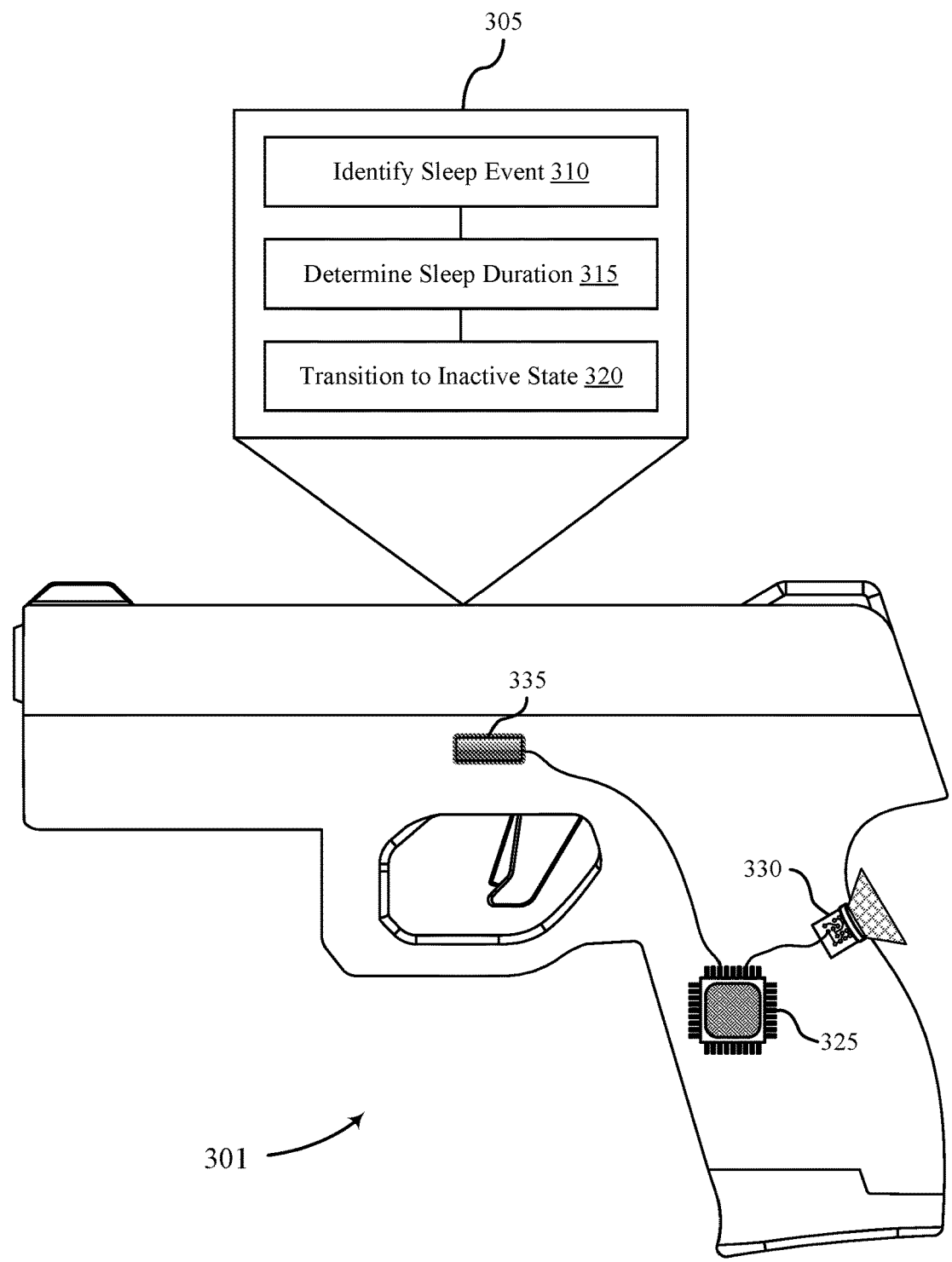
FIG. 3 illustrates an example of a gun that includes electronic components that support identifying a sleep event.

FIG. 3 illustrates an example of a gun 301 that includes electronic components that support identifying a sleep event. The gun 301 includes a processor 325, a presence sensor 330, and a button 335. The button 335 is an example of a mechanism that supports collecting user input from a user of the gun 301. The gun 301 may perform a procedure 305 for transitioning from an active state to an inactive state.

At step 310, the gun 301 may identify a sleep event. Examples of sleep events include a user absence event and a user input event. The gun 301 may identify a user absence event based on an output generated by the presence sensor 330, and the gun 301 may identify a user input event based on an output generated by the button 335. The presence sensor 330 and the button 335 are examples of electronic components of the gun 301.

A user absence event is an example of a sleep event, and a user absence event may be identified based on the presence sensor 330. A presence sensor may include a laser sensor (e.g., a laser proximity sensor), a capacitive sensor (e.g., a capacitive proximity sensor), an inductive sensor (e.g., inductive proximity sensor), a mechanical switch (e.g., a Hall effect sensor), a pressure sensor (e.g., a load cell), a biometric sensor (e.g., a fingerprint scanner, a camera, an image sensor, etc.), an accelerometer, a temperature sensor, or any combination thereof. The presence sensor 330 may generate an output indicating that the user is not grasping the gun 301, and the gun 301 may transition to the inactive state based on the output generated by the presence sensor 330.

As an example, the presence sensor 330 may include a laser sensor, a capacitive sensor, an inductive sensor, a mechanical switch, a pressure sensor, or a biometric sensor, and the presence sensor 330 may generate an output indicating that no body part of the user is touching the gun 301 proximate to the presence sensor 330. As another example, the presence sensor 330 may include an accelerometer or a gyroscope and the presence sensor 330 may generate an output indicating that the movement and/or orientation of the gun 301 is indicative of a lack of a user holding the gun 301. In other words, the presence sensor 330 may generate an output based on an accelerometer or a gyroscope indicating that the gun 301 is not presently being held by a user.

A user input event is an example of a sleep event, and a user input event may be identified based on the button 335. The button 335 is an example of a mechanism for collecting input from a user. It should be understood that the button 335 may be an example of a tactile button, a widget depicted on a touch-sensitive display, a switch, a slider, or the like. The output generated by the button 335 may indicate that the gun 301 is to transition to an inactive state. For example, a user may provide input to the gun 301 by pressing the button 335 while the gun 301 is in an active state, and the gun 301 may transition to an inactive state in response to the button 335 being pressed.

The sleep event may be identified in response to the processor 325 receiving an interrupt signal indicating that the gun 301 is to transition from an active state to an inactive state. For example, a controller may identify an output of the button 335 or an output of the presence sensor 330 and transmit the interrupt signal to the processor 325 based on an analysis of the output. As an example, the controller may identify an output generated by the button 335, determine that the button 335 is configured to transition the gun 301 from a first state to a second state (e.g., from an active state to an inactive state, from a wake state to a sleep state, etc.), and the controller may transmit an interrupt signal to the processor in response to the output and determining that the button 335 is configured to transition the gun 301 from the first state to the second state. As another example, the controller may identify an output generated by the presence sensor 330, determine that the output satisfies a threshold, and transmit the interrupt signal to the processor 325 in response to determining that the output satisfies the threshold. The output may indicate a capacitance value, a light (or electromagnetic radiation) value, a pressure value, an electromagnetic flux density value, or an electromagnetic flux direction, and the threshold may include a time threshold, a measurement threshold, or a value threshold. As an illustrative example, the output may satisfy the threshold when an output voltage is greater than a threshold voltage, when an output voltage is less than a threshold voltage, when an output voltage is greater than a threshold voltage for at least a duration of time, or when an output voltage is less than a threshold voltage for at least a duration of time.

The interrupt signal may be transmitted to an input/output (I/O) pin (e.g., a general-purpose I/O (GPIO) pin) of the processor 325, and the interrupt signal may be transmitted from an electronic component of the gun 301, such as the presence sensor 330, the button 335, or a controller. The gun 301 may include a controller which may be electronically coupled with the presence sensor 330 and/or the button 335.

At step 315, the gun 301 may determine an estimated time duration. The gun 301 may determine the estimated time duration in response to identifying the sleep event at step 310, and the estimated time duration may be used as a sleep timer. For example, the gun 301 may transition to an inactive state at step 320, and the gun 301 may be configured to transition from the inactive state to an active state based on the estimated time duration elapsing. In other words, the gun 301 may be configured to continuously assume the inactive state for a period of time that is less than or equal to the estimated time duration. The estimated time duration may be determined based on an amount of electric charge present is an energy store of the gun 301, an expected power consumption of the gun 301, or an average power consumption of the 301 during a period of time, such as an average power consumption across a trailing period of time (e.g., the trailing hour, the trailing day, the trailing week, etc.). A trailing period of time may be the most recent period of time. For example, the trailing hour may be the hour preceding the present moment.

At step 320, the gun 301 may transition to the inactive state. The gun 301 may transition to the inactive state in response to determining the estimated time duration at step 315 and/or in response to identifying the sleep event at step 310. The gun 301 may transition to the inactive state by terminating a power supply to one or more electronic components, such as a memory cell, a memory array, a memory chip, a sensor, an electronic aiming sight, a processor core, or the like. For example, the processor 325 may be an example of a multi-core processor, and the gun 301 may transition to the inactive state by ceasing the execution of instructions by a core of the processor 325 and terminating the power supply to tightly coupled memory of the core of the processor 325. As part of transitioning to the inactive state, the gun 301 may additionally or alternatively save the state of the core of the processor 325, terminate the power supply to an electronic aiming sight, or terminate the power supply to a non-volatile memory chip.

The quiescent current of the gun 301 may be less than a threshold (250 microamperes (μA)) while the gun 301 is in the inactive state. Maintaining the quiescent current below the threshold results in the gun 301 consuming less power.

As such, assuming the inactive state allows the gun 301 to function for a longer period of time on a single charge, thereby improving the useability of the gun 301 and the longevity of the energy store.

Figure 4:
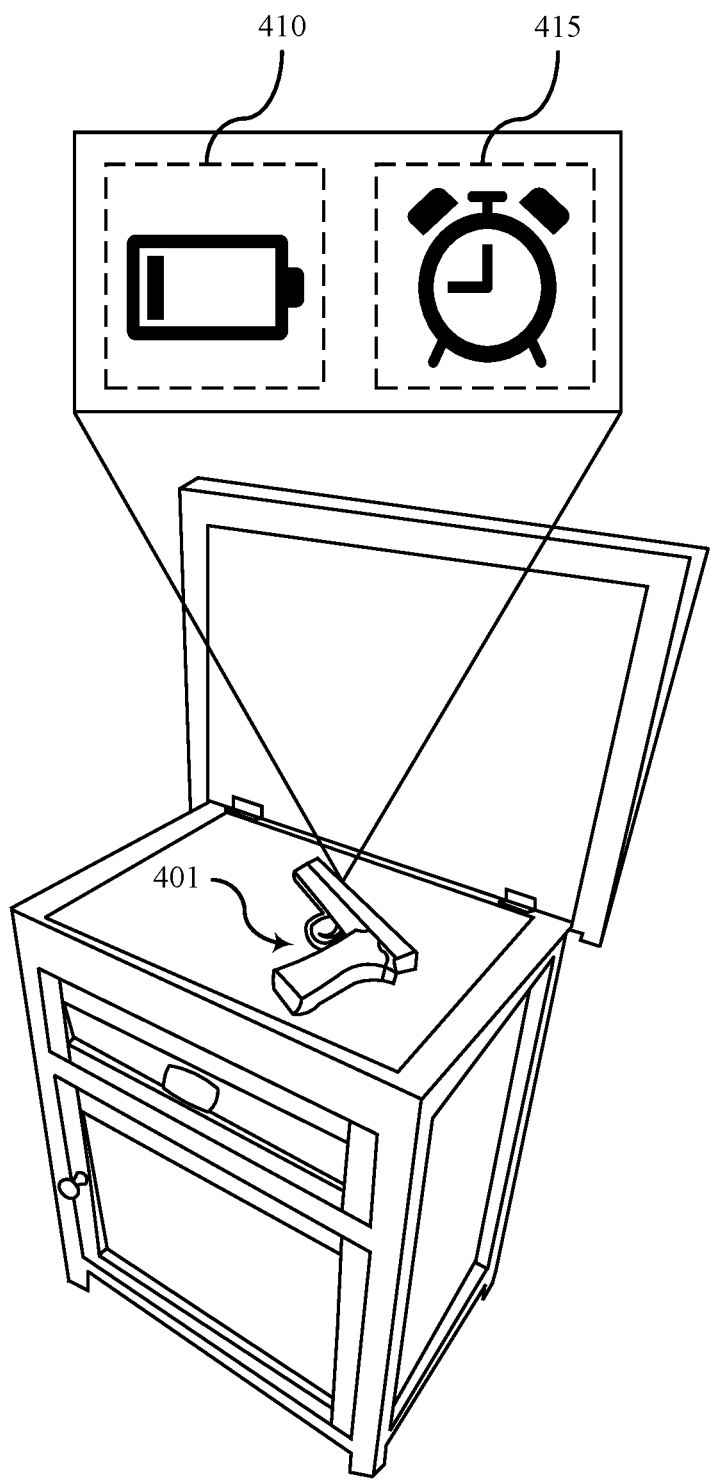
FIG. 4 illustrates an example of a gun that is capable of transitioning to an active state.

FIG. 4 illustrates an example of a gun 401 that is capable of transitioning to an active state. The gun 401 may transition from the inactive state to the active state in response to a wake event, and the gun 401 may perform a system check procedure while in the active state and/or fire a projectile while in the active state.

The gun 401 may temporarily transition from the inactive state to the active state based on an alarm indicating expiration of a sleep timer. In other words, the gun 401 may transition from the inactive state to the active state without any user interaction, and the gun 401 may perform a system check procedure while in the active state. The gun 401 may also transition from the inactive state to the active state in response to a user interacting with the gun 401. For example, a user may pick up the gun 401 prior to expiration of the sleep timer, and the gun 401 may transition from the inactive state to the active state in response to the user picking up the gun 401. The expiration of the sleep timer and the user picking up the gun 401 are examples of wake events.

As part of the system check procedure, the gun 401 may determine a system state of the gun 401, and the gun 401 may generate a notification 415 based on the system state. A charge state of an energy store (e.g., a battery, a battery pack, a capacitor, etc.), an error condition, and a temperature condition are examples of system states of the gun 401. The notification 415 may be a visual notification, an audio notification, a tactile notification, a temperature notification, or the like. As an example, the gun 401 may calculate a charge level of a battery, determine that a low battery state 410 is present based on the charge level being less than a charge threshold, and generate the notification 415 to indicate the low battery state 410. As an example of a notification 415 indicating the low battery state 410, the gun 401 may illuminate a light pipe, an LED, or an aiming sight with a predetermined color of light to indicate that the low battery state 410 is present.

The energy store may include a battery cell, a battery pack, a capacitor, a capacitor bank, or the like. As an illustrative example, the energy store may be an example of a battery pack including one or more batteries, such as a lithium-ion battery, a lithium-ion polymer battery, a lithium cobalt battery, a lithium manganese battery, a lithium phosphate battery, a lithium titanate battery, a lithium-thionyl chloride battery, a nickel cadmium battery, a nickel-metal hydride battery, a zinc-carbon battery, a lead-acid battery, an alkaline battery, or the like.

Figure 5:
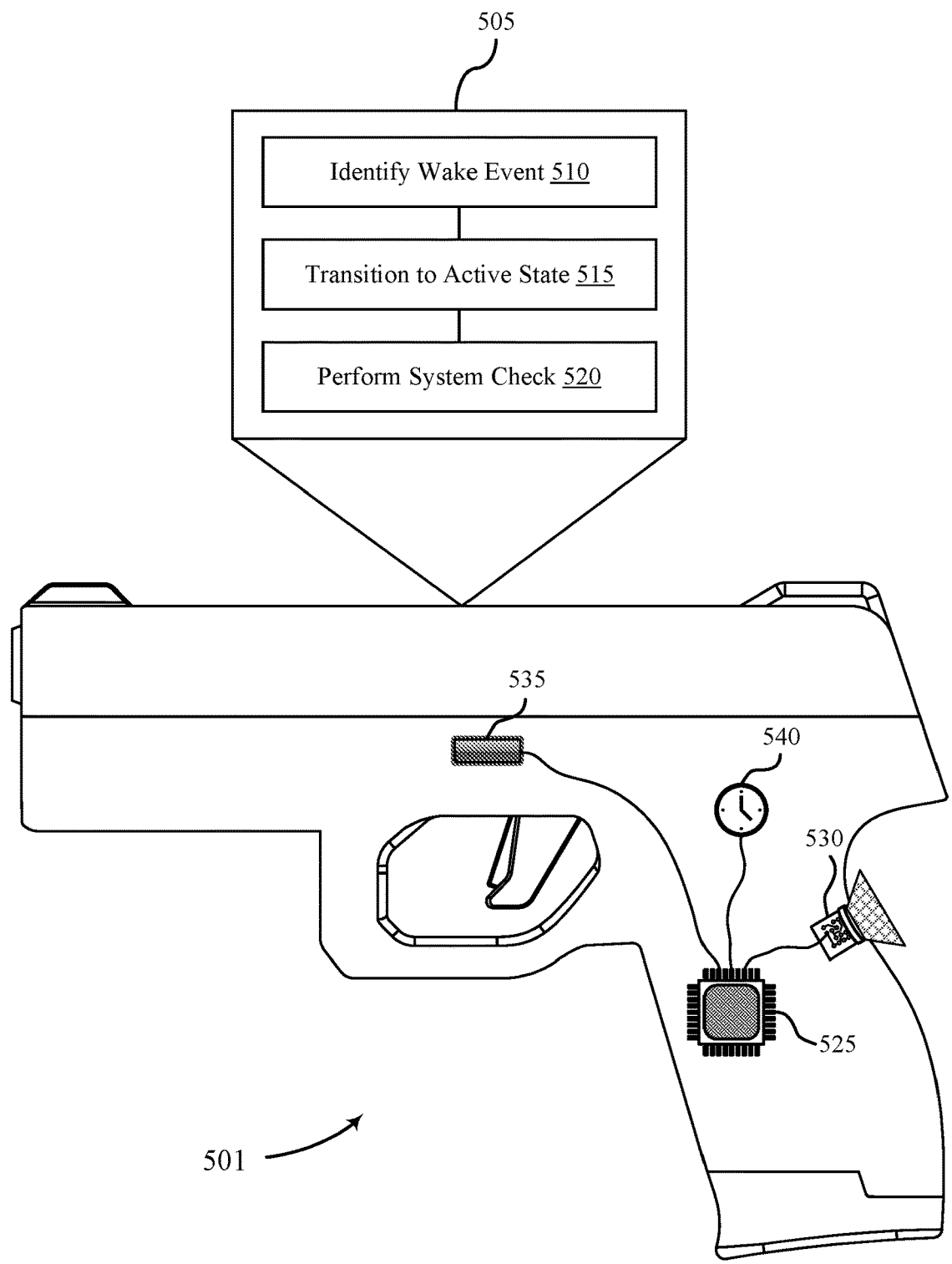
FIG. 5 illustrates an example of a gun that includes electronic components that support identifying a wake event.

FIG. 5 illustrates an example of a gun 501 that includes electronic components that support identifying a wake event. The gun 501 includes a processor 525, presence sensor 530, a button 535, and a timer 540. The button 535 is an example of a mechanism that supporting collecting user input from a user of the gun 501. The gun 501 may perform a procedure 505 for transitioning from an inactive state to an active state.

At step 510, the gun may identify a wake event. Examples of wake events include a user presence event, a user input event, and an alarm event. The gun 501 may identify a user presence event based on an output generated by the presence sensor 530, the gun 501 may identify a user input event based on an output generated by the button 535, and the gun 501 may identify an alarm event based on an output generated by the timer 540. The presence sensor 530, the button 535, and the timer 540 are examples of electronic components of the gun 501.

A user presence event is an example of a wake event, and a user presence event may be identified based on the presence sensor 530. A presence sensor may include a proximity sensor, a biometric sensor, an accelerometer, or an electronic sensor. The presence sensor 530 may generate an output indicating that a user is grasping the gun 501, and the gun 501 may transition to the active state based on the output generated by the presence sensor 530. The output generated by the presence sensor 530 may indicate that a user is grasping the gun 501, or the output generated by the presence sensor 530 may indicate that a body part of the user is proximate to the presence sensor 530.

A user input event is an example of a wake event, and a user input event may be identified based on the button 535. The button 535 is an example of a mechanism for collecting input from a user. It should be understood that the button 535 may be an example of a tactile button, a widget depicted on a touch-sensitive display, a switch, a slider, or the like. The output generated by the button 535 may indicate that the gun 501 is to transition to an active state. For example, a user may provide input to the gun 501 by pressing the button 535 while the gun is in an inactive state, and the gun 501 may transition to an active state in response to the button 535 being pressed. The button 535 may be used to toggle the state of the gun 501. For example, pressing the button 535 while the gun 501 is in an inactive state may cause the gun 501 to transition to an active state, and pressing the button 535 while the gun 501 is in an active state may cause the gun 501 to transition to an inactive state.

An alarm event is an example of a wake event, and an alarm event may be identified based on the timer 540. The timer 540 may include an RTC, such as a clock that uses a frequency selective element (e.g., a piezoelectric element, a quartz crystal, a polycrystalline ceramic, etc.) to keep track of time. The timer 540 may generate an output indicating that a duration of time has elapsed (e.g., an estimated time duration, a sleep time, etc.), and the gun 501 may transition to the active state based on the output generated by the timer 540. As an example, the processor 525 may calculate an estimated time duration based on an amount of electric charge present in an energy store of the gun 501 and set the timer 540 such that the timer will generate an output in response to determining that the estimated time duration has elapsed.

The wake event may be identified in response to the processor 525 receiving an interrupt signal indicating that the gun 501 is to transition from an inactive state to an active state. For example, a controller may identify an output of the presence sensor 530, an output of the button 535, or an output of the timer 540 and transmit the interrupt signal to the processor 525 based on an analysis of the output. As an example, the controller may identify an output generated by the button 535, determine that the button 535 is configured to transition the gun 501 from a first state to a second state (e.g., from an inactive state to an active state, from a sleep state to a wake state, etc.), and the controller may transmit an interrupt signal to the processor 525 in response to the output and determining that the button 535 is configured to transition the gun 501 from the first state to the second state. As another example, the controller may identify an output generated by the presence sensor 530, determine that the output satisfies a threshold, and transmit an interrupt signal to the processor 525 in response to determining that the output satisfies the threshold. The output may indicate a capacitance value, a light (or electromagnetic radiation) value, a pressure value, an electromagnetic flux density value, an electromagnetic flux direction, or the like. As yet another example, the controller may identify an output generated by the timer 540, determine that the timer 540 is configured as a sleep timer, and transmit an interrupt signal to the processor 525 in response to the output and determining that the timer 540 is configured as a sleep timer. In other words, the controller may use the timer 540 to determine that an estimated time duration (e.g., a sleep duration) has elapsed, and the controller may transmit the interrupt signal to the processor 525 in response to the elapse of the estimated time duration.

The interrupt signal may be transmitted to an I/O pin (e.g., a GPIO pin) of the processor 525, and the interrupt signal may be transmitted from an electronic component of the gun 501, such as the presence sensor 530, the button 535, the timer 540, or a controller. The gun 501 may include a controller which may be coupled with the presence sensor 530, the button 535, or the timer 540. The controller may be integrated into an electronic component (the presence sensor 530, the button 535, the timer 540, etc.), or the controller may be electronically coupled with, but separate from, the electronic component.

At step 515, the gun 501 may transition to an active state. The gun 501 may transition to the active state in response to the identifying the wake event at step 510, and the gun 501 may transition to the active state by performing a boot procedure and/or delivering power to an electronic component, such as a memory chip, a processor core, a sensor, or a peripheral component (e.g., an electronic aiming sight or a laser sight). The boot procedure may include delivering power to a processor core, loading boot media (e.g., a boot image) into memory, writing a value to a register of the processor core to indicate the location of the boot media, restoring a previously saved state of the core, executing a set of instructions at the processor core, or any combination thereof.

At step 520, the gun 501 may perform a system check procedure to determine the system state of the gun 501 (e.g., the status or health of the gun). As part of the system check procedure, the gun 501 may calculate an amount of electric charge remaining in an energy store, calculate an average power consumption for a period of time, calculate an estimated time duration for which the gun 501 is capable of operating for with the amount of electric charge, determine whether an error condition is present, determine whether a temperature condition is present, determine whether a moisture condition is present, or the like.

The gun 501 may generate a notification based on the system check procedure. For example, a speaker of the gun 501 may generate an audible noise, an LED or light pipe may be illuminated with a color of light, or a haptic motor may generate a haptic pulse pattern to convey the notification. In some examples, a user may configure the manner in which the gun 501 conveys notifications. For example, the user may configure the gun 501 to illuminate an LED with a first color of light to indicate a low battery notification and to illuminate the LED with a second color of light to indicate a full battery condition. As another example, the user may configure the gun 501 to generate a two-tone chirp noise to indicate an error condition.

Figure 6:
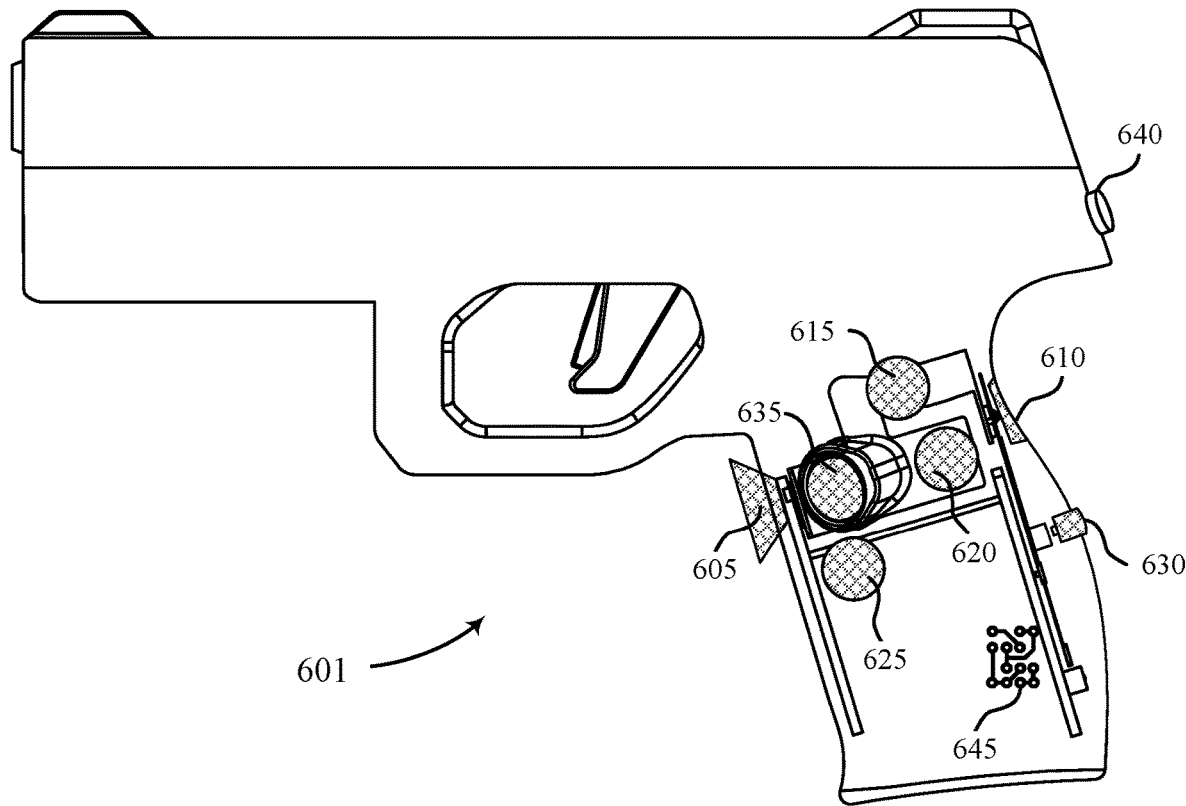
FIG. 6 illustrates an example of a gun that includes presence sensors that may be used to detect user presence events and user absence events.

FIG. 6 illustrates an example of a gun 601 that includes presence sensors that may be used to identify user presence events and user absence events. A presence sensor may be used to determine whether a user is holding, grasping, or touching the gun 601. The gun 601 may transition to an inactive state based on an output of a presence sensor indicating that a user is not touching the gun 601, and the gun 601 may transition to an active state based on an output of a presence sensor indicating that a user is touching the gun 601.

The gun 601 includes examples of presence sensors that may generate outputs indicating whether a user is touching, holding, or otherwise in possession of the gun 601. The presence sensors shown in FIG. 6 are examples of electronic components which may be included in an electromechanical gun.

The gun 601 includes a laser sensor 605 (e.g., a laser proximity sensor), a capacitive sensor 610 (e.g., a capacitive proximity sensor), an inductive sensor 615 (e.g., an inductive proximity sensor), an ultrasonic sensor 620 (e.g., ultrasonic proximity sensor), a pressure sensor 625 (e.g., a load cell), a mechanical switch 630 (e.g., a Hall effect sensor), a fingerprint scanner 635, a camera 640, and an accelerometer 645. The fingerprint scanner 635 and the camera 640 are examples of biometric sensors. The gun 601 may include a controller that is electronically coupled with one or more presence sensors, and the controller may transmit an interrupt signal to a processor based on an analysis of an of an output of a presence sensor. For example, the controller may determine that the output matches a predetermined value, or the controller may determine that the output satisfies a threshold, and the controller may transmit the interrupt to the processor based on the output matching the predetermined value or satisfying the threshold. In some examples, the processor may receive the interrupt signal while in an active state and transition to an inactive state in response to the interrupt signal. In other examples, the processor may receive the interrupt signal while in an inactive state and transition to an active state in response to the interrupt signal.

In some examples, the gun 601 may transition to an inactive state based on (i) an output of a presence sensor indicating that the user is not touching the gun and (ii) expiration of a timer (e.g., a standby timer). For example, the gun 601 may identify a sleep event (e.g., a user absence event, a user input event, etc.), initiate a standby timer in response to identifying the sleep event, determine that a time duration (e.g., a predetermined amount of time, a standby time duration, etc.) has elapsed based on the standby timer, and transition to the inactive state in response to determining that the time duration has elapsed. Transitioning to the inactive state based on the elapse of the time duration improves the usability of the gun 601 by reducing the likelihood of inadvertently transitioning to the inactive state (e.g., the user is adjusting their grip of the gun, the user is switching the hand they're using to hold the gun, etc.).

Figure 7:
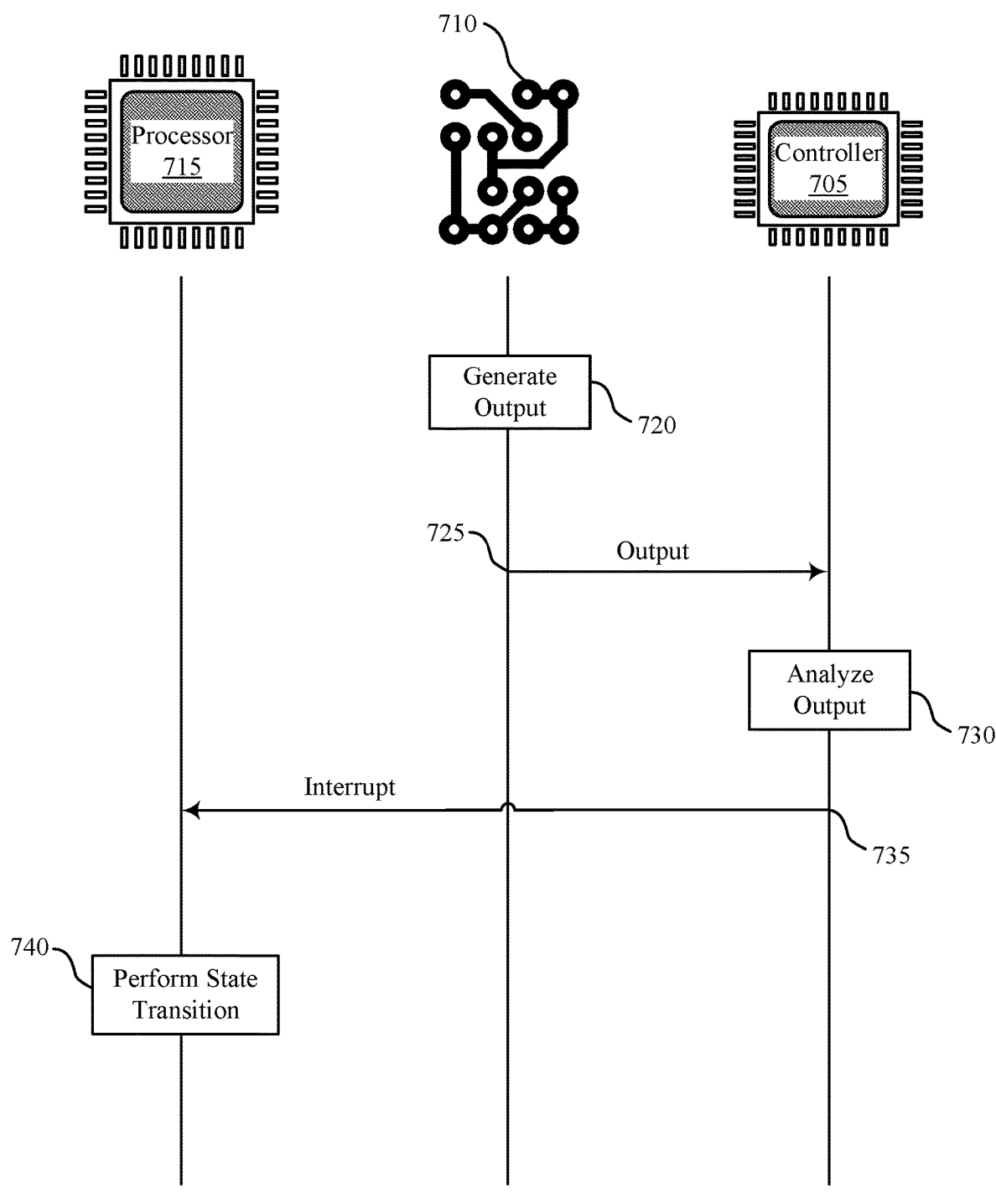
FIG. 7 illustrates an example of a process flow for causing a gun to transition from a first state to a second state.

FIG. 7 illustrates an example of a process flow 700 for causing a gun to transition from a first state to a second state. The process flow 700 includes a controller 705, an electronic component 710, and a processor 715. Alternative examples of the following may be implemented, where some steps are performed in a different order than described or are not performed at all. In some cases, steps may include additional features not mentioned below, or further steps may be added.

The electronic component 710 may be an example of a presence sensor (e.g., a laser proximity sensor, a capacitive proximity sensor, a load cell, a Hall effect sensor, a biometric sensor, an accelerometer, etc.) or an example of a user input collection mechanism (e.g., a button, a display panel, a microphone, etc.). In some examples, the processor 715 may be an example of a multi-core processor. In some examples, the controller 705, the electronic component 710, and the processor 715 may be embedded or integrated in a gun.

At step 720, the electronic component 710 may generate an output. In some examples the output may be an example of a digital signal, while in other examples the output may be an example of an analog signal. As an example, the electronic component 710 may be a button, and the output may be a digital signal indicating that the button has been pressed. As another example, the electronic component 710 may be a capacitive proximity sensor, and the output may be an analog signal indicating a capacitance of the capacitive proximity sensor. As yet another example, the electronic component 710 may be an accelerometer, and the output may be an analog signal indicating an acceleration of the accelerometer (or an acceleration of the gun which the accelerometer is embedded in).

At step 725, the controller 705 may identify the output generated by the electronic component 710. At step 730, the controller 705 may analyze the output generated by the electronic component 710. For example, the output may be an analog signal, and the controller 705 may determine whether the analog signal satisfies a predetermined threshold. As another example, the output may be a digital signal, and the controller 705 may determine whether the digital signal matches a predetermined value.

At step 735, the controller 705 may transmit an interrupt signal to the processor 715, and the processor may transition from a first state to a second state in response to the interrupt signal. In some examples, the controller 705 may determine that the gun is presently in a first state, and the controller 705 may transmit the interrupt to the processor 715 to indicate that the gun is to transition to a second state. In other examples, the controller 705 may transmit the interrupt to the processor 715, and the processor 715 may determine that the gun is presently in a first state. In some illustrative examples, the first state may an inactive state and the second state may an active state, while in other illustrative examples, the first state may be an active state and the second state may be an inactive state.

At step 740, the processor 715 may perform a state transition to transition from a first state to a second state. The processor 715 may transition to an inactive state when presently in an active state, and the processor 715 may transition to an active state when presently in an inactive state. The processor 715 may transition to the active state by initiating execution of instructions at a core and initiating a power supply for a memory chip. The processor 715 may transition to the inactive state by ceasing the execution of instructions at the core and terminating the power supply for the memory chip. In some examples, the core and the memory chip may be aspects of the processor 715. For example, the processor 715 may be a multi-core processor and the core may be a secondary core of the multi-core processor, and the memory chip may be tightly coupled memory of the secondary core.

Figure 8:
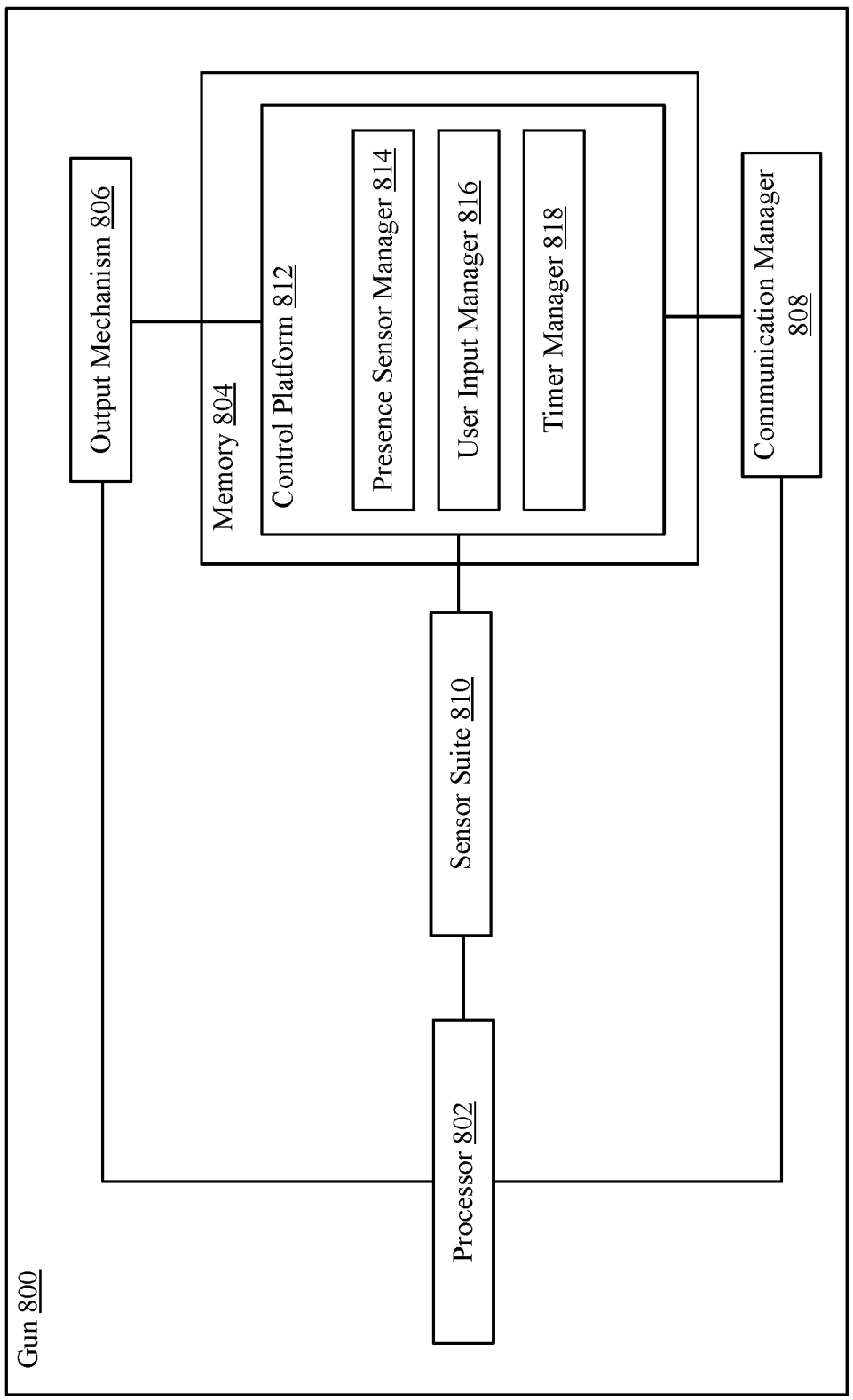
FIG. 8 illustrates an example of a gun that is capable of transitioning between an active state and an inactive state.

FIG. 8 illustrates an example of a gun 800 able to implement a control platform 812 designed to produce outputs that are helpful in ensuring the gun 800 assumes an appropriate state, such as an inactive state or an active state. As further discussed below, the control platform 812 (also referred to as a "management platform" or a "state manager") may be designed to determine that the gun 800 is to transition to an inactive state, to transition the gun 800 to the inactive state, to determine that the gun 800 is to transition to an active state, to transition the gun 800 to the active state, to estimate a time duration (e.g., a sleep duration), and to generate an alarm indicating that the time duration has elapsed.

In some embodiments, the control platform 812 is embodied as a computer program that is executed by the gun 800. In other embodiments, the control platform 812 is embodied as an electrical circuit that performs logical operations of the gun 800. In yet other embodiments, the control platform 812 is embodied as a computer program that is executed by a computing device to which the gun 800 is communicatively connected. In such embodiments, the gun 800 may transmit relevant information to the computing device for processing as further discussed below. Those skilled in the art will recognize that aspects of the computer program could also be distributed amongst the gun 800 and computing device.

The gun 800 can include a processor 802, memory 804, output mechanism 806, and communication manager 808. The processor 802 can have generic characteristics similar to general-purpose processors, or the processor 802 may be an application-specific integrated circuit (ASIC) that provides control functions to the gun 800. In some examples, the processor 802 may include multiple cores. As shown in FIG. 8, the processor 802 can be coupled with all components of the gun 800, either directly or indirectly, for communication purposes.

The memory 804 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the processor 802, the memory 804 can also store data generated by the processor 802 (e.g., when executing the managers of the control platform 812). Note that the memory 804 is merely an abstract representation of a storage environment. The memory 804 could be comprised of actual memory chips or modules.

The output mechanism 806 can be any component that is capable of conveying information to a user of the gun 800. For example, the output mechanism 806 may be a display panel (or simply "display") that includes LEDs, organic LEDs, liquid crystal elements, or electrophoretic elements. Alternatively, the display may simply be a series of illuminants (e.g., LEDs) that are able to indicate the status of the gun 800. Thus, the display may indicate whether the gun 800 is presently in an active state or an inactive state. As another example, the output mechanism 806 may be a loudspeaker (or simply "speaker") that is able to audibly convey information to the user. As yet another example, the output mechanism 806 may be a haptic motor that is able to tactilely convey information to the user.

The communication manager 808 may be responsible for managing communications between the components of the gun 800. Additionally or alternatively, the communication manager 808 may be responsible for managing communications with computing devices that are external to the gun 800. Examples of computing devices include mobile phones, tablet computers, wearable electronic devices (e.g., fitness trackers), and network-accessible server systems comprised of computer servers. Accordingly, the communication manager 808 may be wireless communication circuitry that is able to establish communication channels with computing devices. Examples of wireless communication circuitry include integrated circuits (also referred to as "chips") configured for Bluetooth, Wi-Fi®, NFC, and the like.

Sensors are normally implemented in the gun 800. Collectively, these sensors may be referred to as the "sensor suite" 810 of the gun 800. The sensor suite 810 may include presence sensors that support determining whether a user is holding or touching the gun 800. For example, the gun 800 may include a motion sensor whose output is indicative of motion of the gun 800 as a whole. Examples of motion sensors include multi-axis accelerometers and gyroscopes. As another example, the gun 800 may include a proximity sensor whose output is indicative of proximity of the gun 800 to a nearest obstruction within the field of view of the proximity sensor. A proximity sensor may include, for example, an emitter that is able to emit infrared (IR) light and a detector that is able to detect reflected IR light that is reflected toward the proximity sensor. These types of proximity sensors are sometimes called laser imaging, detection, and ranging (LiDAR) scanners. A capacitive sensor is another example of a proximity sensor. As another example, the gun 800 may include a fingerprint scanner or camera that generates images which can be used for determining whether a user is holding the gun 800 and/or biometric authentication of the user. As shown in FIG. 8, outputs produced by the sensor suite 810 may be provided to the control platform 812 for examination or analysis.

For convenience, the control platform 812 may be referred to as a computer program that resides in the memory 804. However, the control platform 812 could be comprised of software, firmware, or hardware components that are implemented in, or accessible to, the gun 800. In accordance with embodiments described herein, the control platform 812 may include a presence sensor manager 814, a user input manager 816, and a timer manager 818. As an illustrative example, the presence sensor manager 814 may process data generated by, and obtained from, a presence sensor, the user input manager 816 may process data generated by, and obtained from, a user input collection mechanism, and the timer manager 818 may process data obtained from an RTC. Because the data obtained by these managers may have different formats, structures, and content, the instructions executed by these managers can (and often will) be different. For example, the instructions executed by the presence sensor manager 814 to process data generated by a presence sensor (e.g., a laser proximity sensor or a capacitive touch sensor) may be different than the instructions generated by the user input manager 816 to process data generated by a user input collection mechanism (e.g., a button). As a specific example, the presence sensor manager 814 may implement noise reduction algorithms (e.g., for denoising, filtering, smoothing, etc.) that are not necessary for processing data generated by a button.

Figure 9:
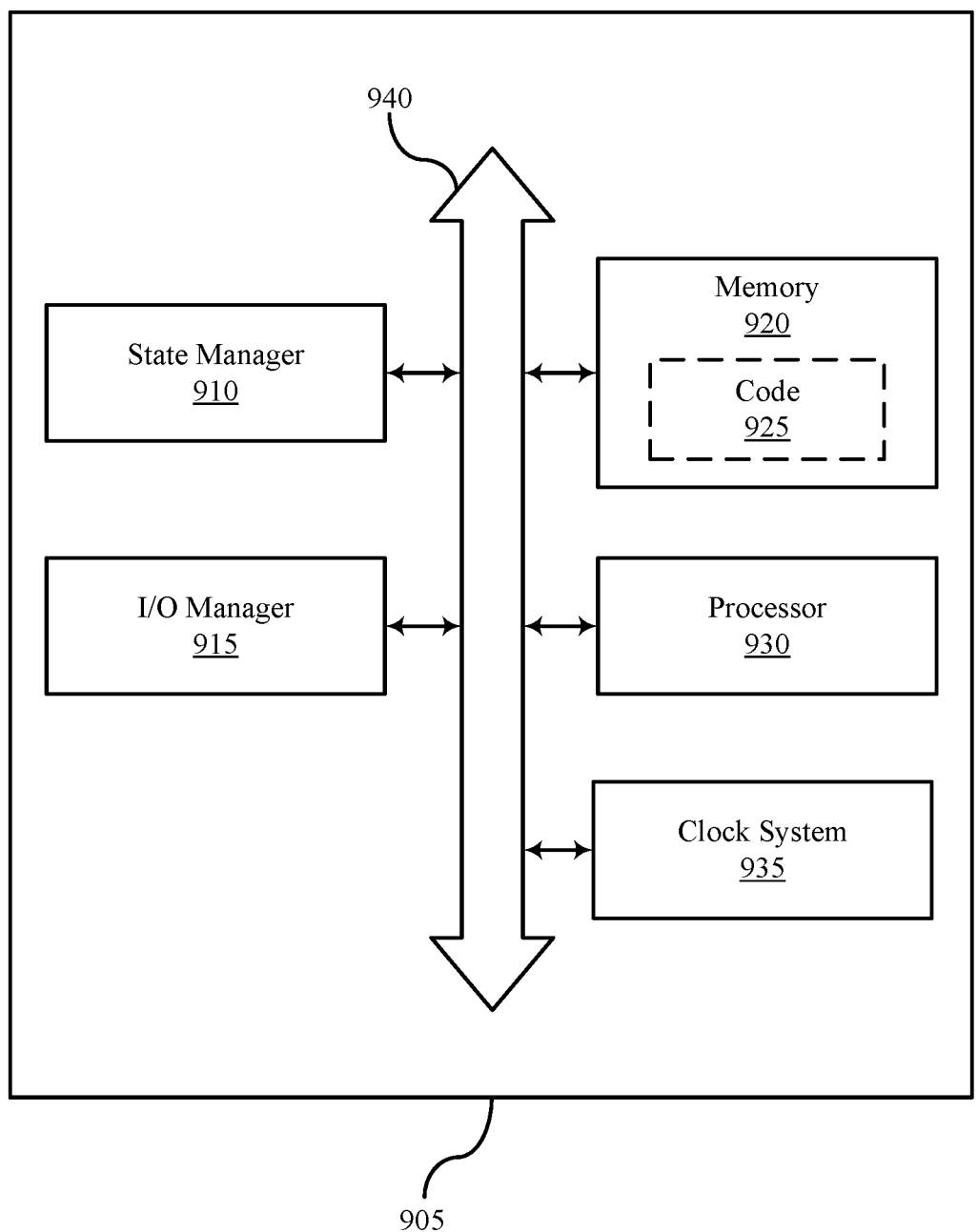
FIG. 9 illustrates an example of a system that is capable of transitioning between an active state and an inactive state.

FIG. 9 illustrates an example of a system 900 that is capable of transitioning between an active state and an inactive state. The device 905 may be operable to implement the techniques, technology, or systems disclosed herein. The device 905 may include components such as a state manager 910, an input/output (I/O) manager 915, memory 920, code 925, a processor 930, a clock system 935, and a bus 940. The components of the device 905 may communicate via one or more buses 940. The device 905 may be an example of, or include components of, a firearm, a gun, an electromechanical gun, or a fire control system.

The state manager 910 may identify a sleep event, compute an estimated time duration, set a sleep timer based on the clock system 935, and cause the device 905 to transition to an inactive state. The state manager 910 may cause the device 905 to transition to the inactive state in response to identifying the sleep event. The state manager 910 may also calculate an amount of electric charge present in an energy store of the device 905, and the estimated time duration may be computed based on the calculated amount of electric charge.

The state manager 910 may identify a wake event and cause the device 905 to transition to an active state. The state manager 910 may cause the device 905 to transition to the active state in response to identifying the wake event. The state manager 910 may perform a system check procedure in response to transitioning to the active state. In some examples, the state manager 910 may perform a boot procedure in response to transitioning to the active state, and the system check procedure may be performed based on the boot procedure. As part of the system check procedure, the state manager 910 may identify a system state of the device 905, such as a charge level of the energy store or an error condition of the processor 930.

The I/O manager 915 may manage input and output signals for the device 905. The I/O manager 915 may also manage various peripherals such an input device (e.g., a button, a switch, a touch screen, a dock, a biometric sensor, a pressure sensor, a heat sensor, a proximity sensor, an RFID sensor, etc.) and an output device (e.g., a monitor, a display, an LED, a speaker, a haptic motor, a heat pipe, etc.).

The memory 920 may include or store code (e.g., software) 925. The memory 920 may include volatile memory, such as random-access memory (RAM) and/or non-volatile memory, such as read-only memory (ROM). The code 925 may be computer-readable and computer-executable, and when executed, the code 925 may cause the processor 930 to perform various operations or functions described here.

The processor 930 may be an example or component of a central processing unit (CPU), an ASIC, or a field programmable gate array (FPGA). In some embodiments, the processor 930 may utilize an operating system or software such as Microsoft Windows®, iOS®, Android®, Linux®, Unix®, or the like. The clock system 935 control a timer for use by the disclosed embodiments. In some examples, the clock system 935 may include an RTC.

The state manager 910, or its sub-components, may be implemented in hardware, software (e.g., software or firmware) executed by a processor, or a combination thereof. The state manager 910, or its sub-components, may be physically located in various positions. For example, in some cases, the state manager 910, or its sub-components may be distributed such that portions of functions are implemented at different physical locations by one or more physical components.

Figure 10:
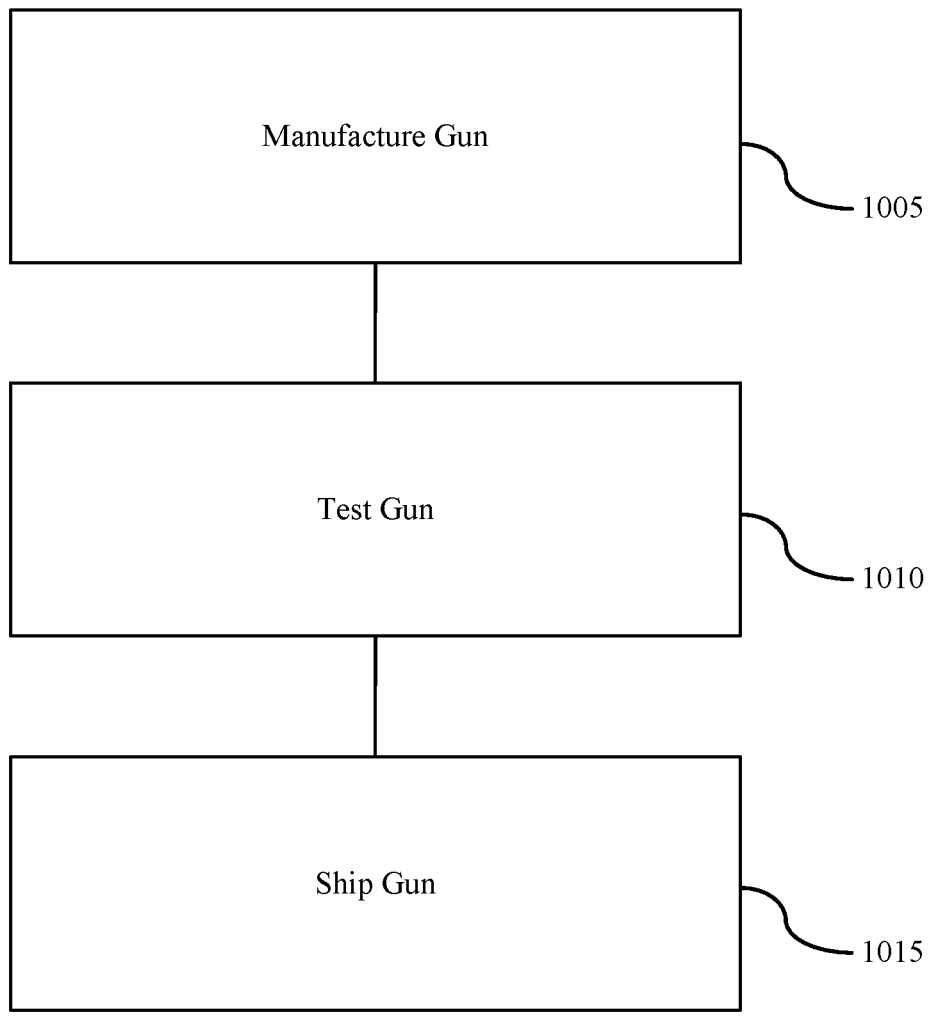
FIG. 10 illustrates an example of a flowchart showing a method of manufacturing a gun that is capable of transitioning between active and inactive states.

FIG. 10 illustrates an example of a flowchart 1000 showing a method of manufacturing a gun that is capable of transitioning between an active state and an inactive state. Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Initially, a gun manufacturer (or simply "manufacturer") may manufacture a gun that is able to implement aspects of the present disclosure (step 1005). For example, the manufacturer may machine, cut, shape, or otherwise make parts to be included in the gun. Thus, the manufacturer may also design those parts before machining occurs, or the manufacturer may verify designs produced by another entity before machining occurs. Additionally or alternatively, the manufacturer may obtain parts that are manufactured by one or more other entities. Thus, the manufacturer may manufacture the gun from components produced entirely by the manufacturer, components produced by other entities, or a combination thereof. Often, the manufacturer will obtain some parts and make other parts that are assembled together to form the gun (or a component of the gun).

The manufacturer may also develop instructions that support identifying wake events, identifying sleep events, computing an estimated time duration (e.g., a sleep duration), transitioning to an active state, and transitioning to an inactive state. For example, the manufacturer may produce software and/or firmware that supports determining whether a user is holding the gun, calculating an estimated time duration, transitioning to an inactive state, and transitioning from the inactive state to the active state in response to elapse of the estimated time duration.

In some embodiments, the manufacturer also generates identifying information related to the gun. For example, the manufacturer may etch (e.g., mechanically or chemically), engrave, or otherwise append identifying information onto the gun itself. As another example, the manufacturer may encode at least some identifying information into a data structure that is associated with the gun. For instance, the manufacturer may etch a serial number onto the gun, and the manufacturer may also populate the serial number (and other identifying information) into a data structure for recording or tracking purposes. Examples of identifying information include the make of the gun, the model of the gun, the serial number, the type of projectiles used by the gun, the caliber of those projectiles, the type of firearm, the barrel length, and the like. In some cases, the manufacturer may record a limited amount of identifying information (e.g., only the make, model, and serial number), while in other cases the manufacturer may record a larger amount of identifying information.

The manufacturer may then test the gun (step 1010). In some embodiments, the manufacturer tests all of the guns that are manufactured. In other embodiments, the manufacturer tests a subset of the guns that are manufactured. For example, the manufacturer may randomly or semi-randomly select guns for testing, or the manufacturer may select guns for testing in accordance with a predefined pattern (e.g., one test per 5 guns, 10 guns, or 100 guns). Moreover, the manufacturer may test the gun in its entirety, or the manufacturer may test a subset of its components. For example, the manufacturer may test the component(s) that it manufactures. As another example, the manufacturer may test newly designed components or randomly selected components. Thus, the manufacturer could test select component(s) of the gun, or the manufacturer could test the gun as a whole. For example, the manufacturer may test the barrel to verify that it meets a precision threshold and the cartridge feed system to verify that it meets a reliability threshold. As another example, the manufacturer may test a group of guns (e.g., all guns manufactured during an interval of time, guns selected at random over an interval of time, etc.) to ensure that those guns fire at a sufficiently high pressure (e.g., 70,000 pounds per square inch (PSI)) to verify that a safety threshold is met.

Testing the gun may include testing software and/or firmware. The manufacturer may test the software and/or firmware to validate the security, performance, or reliability of the software and/or firmware that supports (i) transitioning from an active state to an inactive state and (ii) transitioning from the inactive state to the active state. In some examples, the software may be submitted to one or more third-party entities to audit the software and/or firmware. The software and/or firmware may be tested with emulation tools that simulate the components of the gun, or the software and/or firmware may be tested on the components of the gun. In response to testing, the software and/or firmware may be deployed to the gun.

Thereafter, the manufacturer may ship the gun to a dealer (step 1015). In the event that the gun is a firearm, the manufacturer may ship the gun to a Federal Firearms Licensed (FFL) dealer. For example, a purchaser (also referred to as a "customer") may purchase the apparatus through a digital channel or non-digital channel. Examples of digital channels include web browsers, mobile applications, and desktop applications, while examples of non-digital channels include ordering via the telephone and ordering via a physical storefront. In such a scenario, the gun may be shipped to the FFL dealer so that the purchaser can obtain the gun from the FFL dealer. The FFL dealer may be directly or indirectly associated with the manufacturer of the gun. For example, the FFL dealer may be a representative of the manufacturer, or the FFL dealer may sell and distribute guns on behalf of the manufacturer (and possibly other manufacturers).

Note that while the sequences of the steps performed in the processes described herein are exemplary, the steps can be performed in various sequences and combinations. For example, steps could be added to, or removed from, these processes. Similarly, steps could be replaced or reordered. As an example, the manufacturer may iteratively test components while manufacturing the gun, and therefore perform multiple iterations of steps 1005 and 1010 either sequentially or simultaneously (e.g., one component may be tested while another component is added to the gun). Thus, the descriptions of these processes are intended to be open ended.

Figure 11:
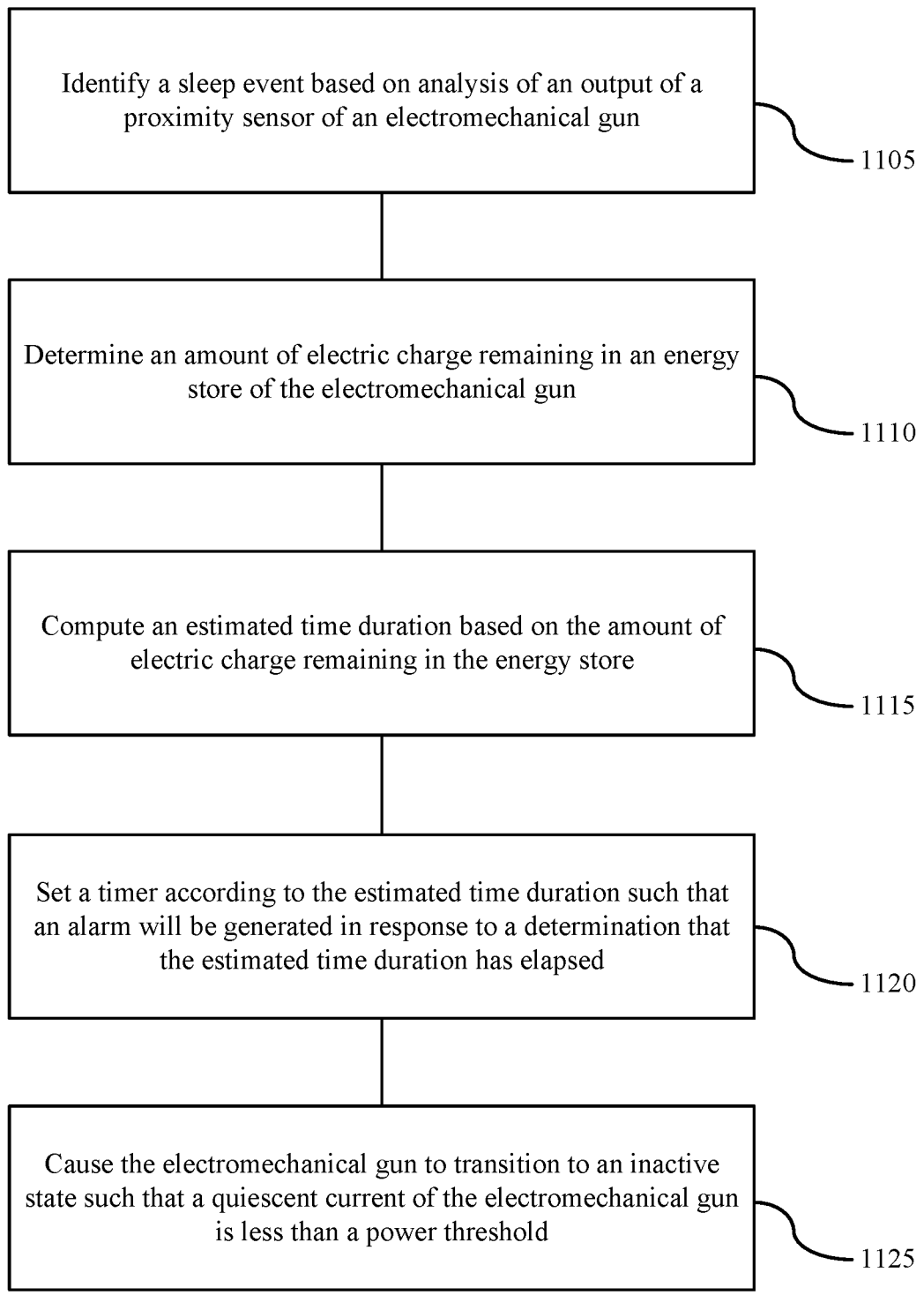
FIG. 11 illustrates an example of a flowchart showing a method of reducing power consumption at an electromechanical gun.

FIG. 11 shows a flowchart illustrating a method 1100 showing a method of reducing power consumption at an electromechanical gun. The operations of the method 1100 may be implemented by an electromechanical gun or its components as described herein. For example, the operations of the method 1100 may be performed by one or more components of an electromechanical gun, such as a processor, a controller, or a state manager. In some examples, a gun may execute a set of instructions to control the functional elements of the to perform the described functions. Additionally or alternatively, the gun may perform aspects of the described functions using special-purpose hardware.

At step 1105, the electromechanical gun may identify a sleep event based on analysis of an output of a proximity sensor of an electromechanical gun. The proximity sensor may be an example of a laser proximity sensor, and the electromechanical gun may identify the sleep event based on the output satisfying a threshold. For example, the electromechanical gun may identify the sleep event based on the voltage of the output satisfying a voltage threshold. In some examples, the laser proximity sensor may transmit light and the voltage of the output may be representative of an amount of light reaching the laser proximity sensor after being reflected off of an object, such as a hand that is holding the electromechanical gun.

At step 1110, the electromechanical gun may determine an amount of electric charge remaining in an energy store of the electromechanical gun. The amount of electric charge may be measured in milliampere-hours (mAh), ampere-hours (Ah), coulombs, or the like.

At step 1115, the electromechanical gun may compute an estimated time duration based on the amount of electric charge remaining in the energy store. The electromechanical gun may compute the estimated time duration based on a projected amount of time that the electromechanical gun can operate for in an inactive state with the determined amount of electric charge.

At step 1120, the electromechanical gun may set a timer according to the estimated time duration such that an alarm will be generated in response to a determination that the estimated time duration has elapsed. A clock, such as an RTC may be used to monitor the passage of time and determine that the estimated time duration has elapsed. An interrupt is an example of an alarm, and the interrupt may be transmitted to a processor of the electromechanical gun to indicate that the estimated time duration has elapsed.

At step 1125, the electromechanical gun may be caused to transition to an inactive state such that a quiescent current of the electromechanical gun is less than a power threshold. In some examples, the electromechanical gun may be caused to transition to the inactive state by terminating the power supply to one or more electronic components, such as a memory chip or a peripheral component.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Figure 12:
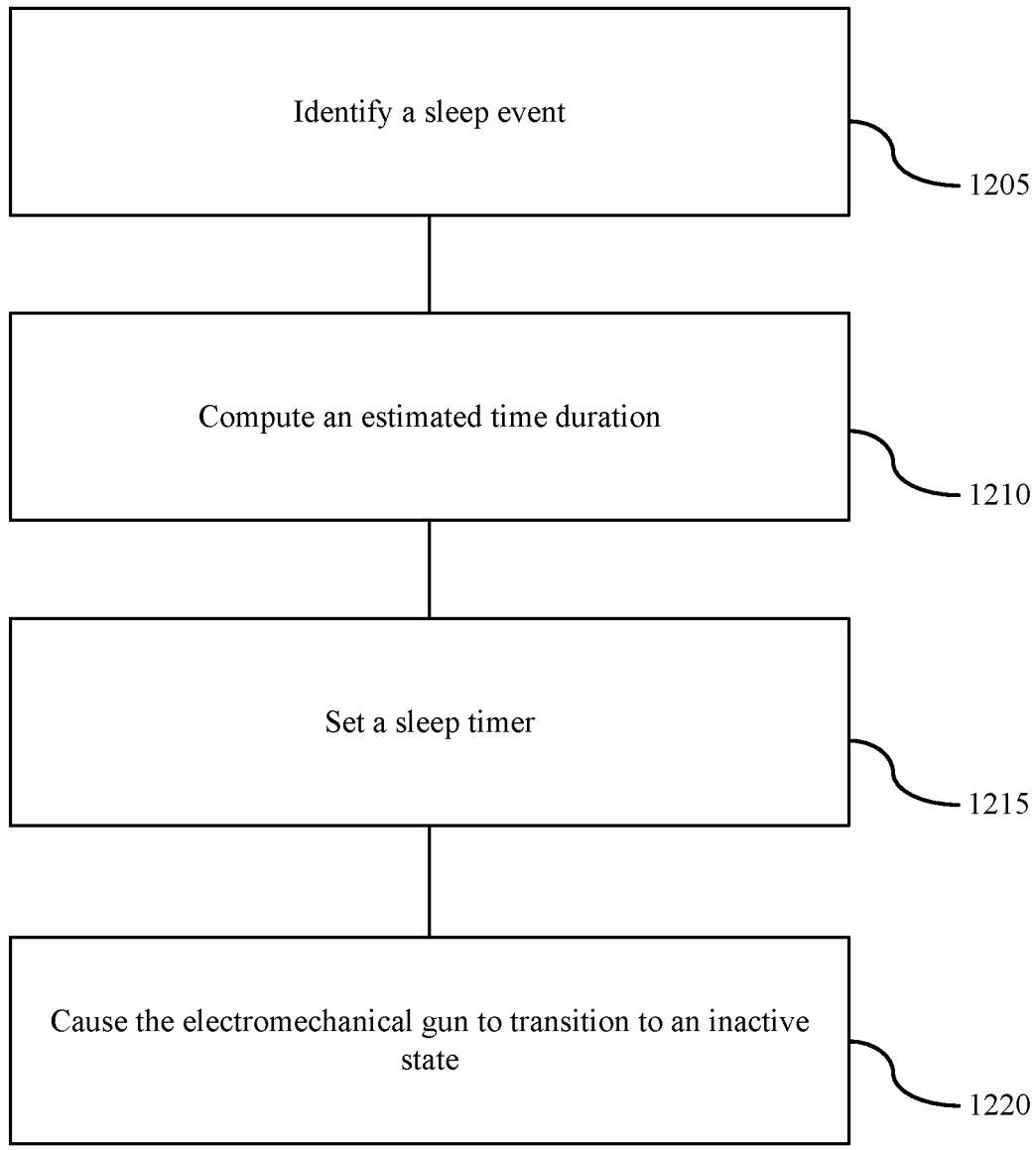
FIG. 12 illustrates an example of a flowchart showing a method of reducing power consumption at an electromechanical gun.

FIG. 12 shows a flowchart illustrating a method 1200 showing a method of reducing power consumption at an electromechanical gun. The operations of the method 1200 may be implemented by an electromechanical gun or its components as described herein. For example, the operations of the method 1200 may be performed by one or more components of an electromechanical gun, such as a processor, a controller, or a state manager. In some examples, a gun may execute a set of instructions to control the functional elements of the to perform the described functions. Additionally or alternatively, the gun may perform aspects of the described functions using special-purpose hardware.

At step 1205, the electromechanical gun may identify a sleep event. The sleep event may include a user presence event, a user input event, or expiration of a standby timer. The electromechanical gun may identify the sleep event based on a presence sensor (e.g., a laser proximity sensor, a capacitive touch sensor, a Hall effect sensor, etc.), a mechanism for collecting user input (e.g., a button, a touch-sensitive display, etc.), or a clock (e.g., an RTC).

At step 1210, the electromechanical gun may compute an estimated time duration. In some examples, the estimated time duration may be configured as an upper limit for an amount of time the electromechanical gun will be permitted to continuously assume an inactive state. For example, the electromechanical gun may be configured to assume a sleep state for the estimated time duration, but the electromechanical gun may transition to an active state in response to a user presence event or a user input event, which may occur prior to the passage of the estimated time duration.

At step 1215, the electromechanical gun may set a sleep timer. In some examples, the sleep time may be set according to the estimated time duration such that an interrupt (e.g., an alarm) will be generated in response to a determination that the estimated time duration has elapsed.

At step 1220, the electromechanical gun may be caused to transition to an inactive state. In some examples, the electromechanical gun may transition to the inactive state by terminating a power supply to a second electronic component of the electromechanical gun. The second electronic component may be a secondary core of a multi-core processor, memory that is tightly coupled with the secondary core, memory that is on the same electrical chip as the processor, or a peripheral component of the gun (e.g., a laser sight or an electronic sight).

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Figure 13:
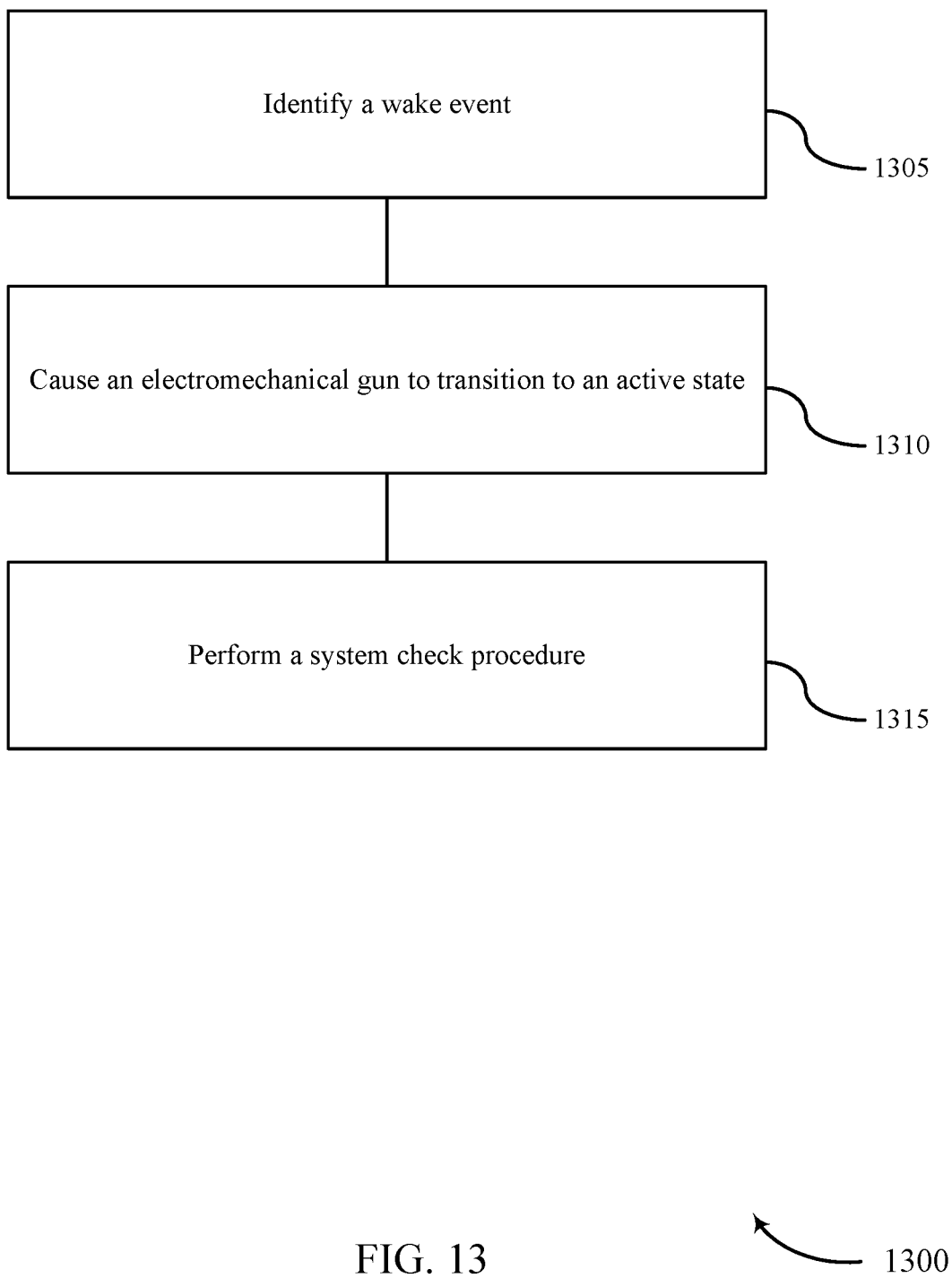
FIG. 13 illustrates an example of a flowchart showing a method of transitioning from an inactive state to an active state.

FIG. 13 shows a flowchart illustrating a method 1300 showing a method of transitioning from an inactive state to an active state. The operations of the method 1300 may be implemented by an electromechanical gun or its components as described herein. For example, the operations of the method 1300 may be performed by one or more components of an electromechanical gun, such as a processor, a controller, or a state manager. In some examples, a gun may execute a set of instructions to control the functional elements of the to perform the described functions. Additionally or alternatively, the gun may perform aspects of the described functions using special-purpose hardware.

At step 1305, the electromechanical gun may identify a wake event. In some examples, the electromechanical gun may identify the wake event based on an analysis of a second output of the first electronic component. For example, the electromechanical gun may identify the wake event based on the second output matching a predetermined value or based on the second output satisfying a predetermined threshold.

At step 1310, the electromechanical gun may be caused to transition to an active state. The electromechanical gun may transition to the active state by performing a boot procedure, and performing the boot procedure may include (i) delivering power to the second electronic component and (ii) executing a set of instructions at a processor of the electromechanical gun.

At step 1315, the electromechanical gun may perform a system check procedure. The electromechanical gun may perform the system check procedure in response to the boot procedure, and performing the system check procedure may include (i) calculating a second amount of electric charge remaining in an energy store of the electromechanical gun and (ii) determining whether an error condition is present. In some examples, the electromechanical gun may determine that the error condition is present based on a temperature measurement satisfying a threshold temperature.

In some examples, the electromechanical gun may generate a notification to indicate the second amount of electric charge, the error condition, or both. The electromechanical gun may generate the notification based on the system check procedure, and the notification may include an audio tone, a visual icon, or a haptic pulse.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Examples

Several aspects of the present disclosure are set forth examples. Note that, unless otherwise specified, all of these examples can be combined with one another. Accordingly, while a feature may be described in the context of a given example, the feature may be similarly applicable to other examples.

In some examples, the techniques described herein relate to a method of reducing power consumption at an electromechanical gun, the method including: identifying a sleep event based on an analysis of an output of a proximity sensor of the electromechanical gun satisfying a threshold, wherein the output is representative of an amount of reflected light reaching a lens of the proximity sensor; determining, in response to the identifying the sleep event, an amount of electric charge remaining in an energy store of the electromechanical gun; computing an estimated time duration based on the amount of electric charge remaining in the energy store, wherein the amount of electric charge is capable of powering the electromechanical gun in an inactive state for at least the estimated time duration; setting a timer according to the estimated time duration such that an alarm will be generated in response to a determination that the estimated time duration has elapsed; and causing the electromechanical gun to transition to the inactive state such that a quiescent current of the electromechanical gun is less than a power threshold, wherein the causing the electromechanical gun to transition to the inactive state includes: ceasing execution of instructions at a processor core of the electromechanical gun; and terminating a power supply to a memory chip of the electromechanical gun.

In some examples, the techniques described herein relate to a method of reducing power consumption at an electromechanical gun, the method including: identifying a sleep event based on an analysis of an output of a first electronic component of the electromechanical gun; computing an estimated time duration, wherein the estimated time duration is configured as an upper limit for an amount of time the electromechanical gun will be permitted to continuously assume an inactive state; setting a sleep timer according to the estimated time duration such that an interrupt will be generated in response to a determination that the estimated time duration has elapsed; and causing the electromechanical gun to transition to the inactive state by terminating a power supply to a second electronic component of the electromechanical gun.

In some examples, the techniques described herein relate to a method, further including: determining, in response to the identifying the sleep event, an amount of electric charge remaining in the energy store of the electromechanical gun, wherein the estimated time duration is based on the amount of electric charge remaining in the energy store.

In some examples, the techniques described herein relate to a method, further including: calculating an average power consumption, wherein the estimated time duration is further based on a projection of the average power consumption.

In some examples, the techniques described herein relate to a method, wherein the output is indicative of a press of a button, by a user, indicating that the electromechanical gun is to transition to the inactive state.

In some examples, the techniques described herein relate to a method, wherein the first electronic component includes the button.

In some examples, the techniques described herein relate to a method, wherein the output is indicative of a lack of a user touching the electromechanical gun.

In some examples, the techniques described herein relate to a method, further including: setting a standby timer according to a predetermined time duration, wherein the causing the electromechanical gun to transition to the inactive state is in response to a determination that the predetermined time duration has elapsed.

In some examples, the techniques described herein relate to a method, wherein the first electronic component includes a laser sensor, and wherein the method further includes: transmitting, by the laser sensor, light into an ambient environment, wherein the output represents an amount of reflected light that returns to the laser sensor; and determining that the amount of reflected light satisfies an inactivity threshold, wherein the identifying the sleep event is further based on the output satisfying the inactivity threshold. The amount of reflected light may satisfy a threshold amount of light of the inactivity threshold, the amount of reflected light may satisfy a threshold time duration of the inactivity threshold, or the amount of reflected light may satisfy the threshold amount of light of the inactivity threshold and the threshold time duration of the inactivity threshold.

In some examples, the techniques described herein relate to a method, wherein the first electronic component includes a capacitance sensor, and wherein the method further includes: measuring, by the capacitance sensor, a capacitance value that indicates whether a body part is presently touching the electromechanical gun proximate to the capacitance sensor; and determining that the capacitance value satisfies an inactivity threshold that is indicative of nonuse of the electromechanical gun, wherein the identifying the sleep event is further based on the capacitance value satisfying the inactivity threshold. The capacitance value may satisfy the inactivity threshold in terms of in terms of value or time. The capacitance value may satisfy a threshold capacitance value of the inactivity threshold, the capacitance value may satisfy a threshold time duration of the inactivity threshold, or the capacitance value may satisfy the threshold capacitance value of the inactivity threshold and the threshold time duration of the inactivity threshold.

In some examples, the techniques described herein relate to a method, wherein the first electronic component includes a Hall effect sensor, and wherein the method further includes: measuring, by the Hall effect sensor, a magnetic flux value that indicates whether a body part is presently touching the electromechanical gun proximate to the Hall effect sensor; and determining that the magnetic flux value satisfies an inactivity threshold, wherein the identifying the sleep event is further based on the magnetic flux value satisfying the inactivity threshold. The magnetic flux value may satisfy a threshold magnetic flux value of the inactivity threshold, the magnetic flux value may satisfy a threshold time duration of the inactivity threshold, or the magnetic flux value may satisfy the threshold magnetic flux value of the inactivity threshold and the threshold time duration of the inactivity threshold.

In some examples, the techniques described herein relate to a method, wherein a direction of the magnetic flux value satisfies the inactivity threshold.

In some examples, the techniques described herein relate to a method, wherein a density of the magnetic flux value satisfies the inactivity threshold.

In some examples, the techniques described herein relate to a method, wherein the first electronic component includes a load cell, and wherein the method further includes: measuring, by the load cell, a force value that indicates whether a body part is presently grasping the electromechanical gun proximate to the load cell; and determining that the force value satisfies an inactivity threshold, wherein the identifying the sleep event is further based on the force value satisfying the inactivity threshold. The force value may satisfy a threshold force value of the inactivity threshold, the force value may satisfy a threshold time duration of the inactivity threshold, or the force value may satisfy the threshold force value of the inactivity threshold and the threshold time duration of the inactivity threshold.

In some examples, the techniques described herein relate to a method, wherein the first electronic component includes n accelerometer, and wherein the method further includes: measuring, by the accelerometer, proper acceleration of the electromechanical gun; and determining that the proper acceleration satisfies an inactivity threshold, wherein the identifying the sleep event is further based on the proper acceleration satisfying the inactivity threshold. The proper acceleration may satisfy a threshold acceleration of the inactivity threshold, the proper acceleration may satisfy a threshold time duration of the inactivity threshold, or the force value may satisfy the threshold acceleration of the inactivity threshold and the threshold time duration of the inactivity threshold.

In some examples, the techniques described herein relate to a method, wherein a quiescent current of the electromechanical gun operating in the inactive state is less than a quiescent current threshold.

In some examples, the techniques described herein relate to a method, wherein the quiescent current threshold is between 50 microamperes and 1,000 microamperes.

In some examples, the techniques described herein relate to a method, further including: identifying a wake event based on an analysis of a second output of the first electronic component; and causing the electromechanical gun to transition to an active state by performing a boot procedure, wherein the boot procedure includes: delivering power to the second electronic component; and executing a set of instructions at a processor of the electromechanical gun.

In some examples, the techniques described herein relate to a method, further including: performing, in response to the boot procedure, a system check procedure to (i) calculate a second amount of electric charge remaining in the energy store of the electromechanical gun and (ii) determine whether an error condition is present.

In some examples, the techniques described herein relate to a method, further including: generating, based on the system check procedure, a notification to indicate the second amount of electric charge, the error condition, or both.

In some examples, the techniques described herein relate to a method, wherein the notification includes an audio tone, a visual icon, or a haptic pulse.

In some examples, the techniques described herein relate to a method, further including: determining that the sleep timer has elapsed, wherein the second output is indicative of the elapse of the sleep timer.

In some examples, the techniques described herein relate to a method, wherein the determining that the sleep timer has elapsed is based on a real time clock of the electromechanical gun, and wherein the real time clock is capable of functioning with less than 550 nanowatts of power.

In some examples, the techniques described herein relate to a method, further including: determining, in response to the second output of the first electronic component satisfying an activity threshold, that a body part is presently touching the electromechanical gun proximate to the first electronic component.

In some examples, the techniques described herein relate to a method, wherein the first electronic component includes a laser sensor, a capacitive sensor, an inductive sensor, a switch, a load cell, a biometric sensor, or an accelerometer.

In some examples, the techniques described herein relate to a method, wherein the second output satisfying the activity threshold includes a voltage of the second output satisfying the activity threshold, an amperage of the second output satisfying the activity threshold, or both.

In some examples, the techniques described herein relate to an electromechanical gun capable of assuming an inactive state to reduce power consumption, the electromechanical gun including: an energy store that is capable of storing at least 500 milliampere hours of electric charge; a real time clock including a crystal oscillator, wherein the real time clock is operable to track passage of time based on oscillations of the crystal oscillator; a presence sensor that is configured to generate an output to indicate that a body part is touching the electromechanical gun; a controller that is electronically coupled with the presence sensor, wherein the controller is configured to generate an interrupt signal based on the output generated by the presence sensor; and a processor that is electronically coupled with the controller and the energy store, wherein the processor is configured to cause the electromechanical gun to transition between an active state and the inactive state based on interrupt signals generated by the controller.

In some examples, the techniques described herein relate to an electromechanical gun, further including: an electronic fire control system that is electronically coupled with the energy store, wherein the electronic fire control system is operable to cause the electromechanical gun to discharge a projectile.

In some examples, the techniques described herein relate to an electromechanical gun, further including: a capacitor that is electronically coupled with the energy store, wherein the energy store is configured to charge the capacitor with electric charge, and wherein the capacitor is configured to selectively discharge electric charge.

In some examples, the techniques described herein relate to an electromechanical gun, wherein the electronic fire control system is operable to cause the electromechanical gun to discharge the projectile in response to directing electric charge from the energy store to an actuator of the electronic fire control system so as to activate the actuator, and wherein activating the actuator results in displacement of the actuator causing displacement of a firing pin, a striker, a hammer, a sear, a sear linkage, or any combination thereof.

In some examples, the techniques described herein relate to an electromechanical gun, wherein the electronic fire control system is operable to cause the electromechanical gun to discharge the projectile in response to directing electric charge from the energy store to a conductive firing pin of the electronic fire control system so as to activate the conductive firing pin, and wherein activating the conductive firing pin results in ignition of an electronically activated cartridge propellent.

In some examples, the techniques described herein relate to an electromechanical gun, further including: a button that is electronically coupled with the controller, wherein the button is configured to generate a second output, and wherein the controller is configured to generate the interrupt signal based on the second output generated by the button.

In some examples, the techniques described herein relate to an electromechanical gun, wherein the electromechanical gun is configured to operate with a quiescent current of less than 250 microamperes while in the inactive state.

In some examples, the techniques described herein relate to an electromechanical gun, wherein the real time clock is capable of functioning with less than 500 nanowatts of power.

In some examples, the techniques described herein relate to an electromechanical gun, wherein the presence sensor is capable of functioning with less than 150 microwatts of power.

In some examples, the techniques described herein relate to a method of managing power consumption of an electromechanical gun during periods of nonuse, the method including: discovering an occurrence of a sleep event through analysis of outputs produced by a proximity sensor of the electromechanical gun; determining, in response to said discovering, (i) an amount of electric charge remaining in an energy store of the electromechanical gun, and (ii) an estimated duration based on the amount of electric charge; and causing the electromechanical gun to transition to an inactive state, in which a current drawn by the electromechanical gun is less than a threshold, for no longer than the estimated duration.

In some examples, the techniques described herein relate to a method, wherein the sleep event includes a user absence event, a user input event, an elapse of a standby time, or any combination thereof.

In some examples, the techniques described herein relate to a method, wherein the current drawn by the electromechanical gun is less than a threshold current that is between 49 μA and μA 251.

In some examples, the techniques described herein relate to a method, further including: discovering an occurrence of a wake event through analysis of additional outputs produced by a proximity sensor of the electromechanical gun; and causing the electromechanical gun to transition to an active state, in which a current drawn by the electromechanical gun is greater than the threshold.

In some examples, the techniques described herein relate to a method, wherein the wake event includes a user presence event, a user input event, an elapse of a sleep timer, or any combination thereof.

Remarks

The Detailed Description provided herein, in connection with the figures, describes example configurations and does not represent all the examples that may be implemented or that are within the scope of the claims. The term "example" used herein means "serving as an illustration or instance," and not "a preferred example."

The functions described herein may be implemented with a controller. A controller may include a state manager, a special-purpose processor, a general-purpose processor, a digital signal processor (DSP), a CPU, a graphics processing unit (GPU), a microprocessor, a tensor processing unit (TPU), a neural processing unit (NPU), an image signal processor (ISP), a hardware security module (HSM), an ASIC, a programmable logic device (such as an FPGA), a state machine, a circuit (such as a circuit including discrete hardware components, analog components, or digital components), or any combination thereof. Some aspects of a controller may be programmable, while other aspects of a control may not be programmable. In some examples, a digital component of a controller may be programmable (such as a CPU), and in some other examples, an analog component of a controller may not be programmable (such as a differential amplifier).

In some cases, instructions or code for the functions described herein may be stored on or transmitted over a computer-readable medium, and components implementing the functions may be physically located at various locations. Computer-readable media includes both non-transitory computer storage media and communication media. A non-transitory storage medium may be any available medium that may be accessed by a computer or component. For example, non-transitory computer-readable media may include RAM, SRAM, DRAM, ROM, EEPROM, flash memory, magnetic storage devices, or any other non-transitory medium that may be used to carry and/or store program code means in the form of instructions and/or data structures. The instructions and/or data structures may be accessed by a special-purpose processor, a general-purpose processor, a manager, or a controller. A computer-readable media may include any combination of the above, and a compute component may include computer-readable media.

In the context of the specification, the term "left" means the left side of the gun when the gun is held in an upright position, where the term "upright position" generally refers to a scenario in which the gun is oriented as if in a high-ready position with the barrel roughly parallel to the ground. The term "right" means the right side of the gun when the gun is held in the upright position. The term "front" means the muzzle end (also referred to as the "distal end") of the gun, and the term "back" means the grip end (also referred to as the "proximal end") of the gun. The terms "top" and "bottom" mean the top and bottom of the gun as the gun is held in the upright position. The relative positioning terms such as "left," "right," "front," and "rear" are used to describe the relative position of components. The relative positioning terms are not intended to be limiting relative to a gravitational orientation, as the relative positioning terms are intended to be understood in relation to other components of the gun, in the context of the drawings, or in the context of the upright position described above.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. An electromechanical gun that is configured to assume an inactive state to reduce power consumption, the electromechanical gun comprising:
an energy store that is configured to store and selectively discharge electric charge;
a processor that is electronically coupled with the energy store, wherein the processor is configured to transition between an active state and the inactive state, and wherein the processor consumes less power while in the inactive state than while in the active state, and wherein the electromechanical gun selectively fires projectiles from a barrel of the electromechanical gun while in the active state; and
a controller that is electronically coupled with the processor, wherein the controller is configured to:
identify a wake event based on an output generated by an accelerometer of the electromechanical gun, wherein the output indicates that a user is grasping the electromechanical gun,
transmit, in response to the output, an activation signal to the processor, wherein the activation signal is designed to cause the processor to transition to the active state, and wherein the processor is configured execute a set of instructions to analyze data generated by a biometric authentication sensor of the electromechanical gun while in the active state, and
cause, in response to the output, power to be delivered to the biometric authentication sensor.

2. A gun comprising:
an energy store that is configured to store electric charge;
a processor that is electronically coupled with the energy store, wherein the processor is configured to transition in between an active state and an inactive state; and
a controller that is electronically coupled with the processor, wherein the controller is configured to:
identify a wake event based on an output generated by an electronic component of the gun,
transmit, in response to the output, an activation signal to the processor, wherein the activation signal is designed to cause the processor to transition to the active state, and wherein the processor is configured execute a set of instructions to analyze data generated by an authentication sensor of the gun while in the active state, and
cause, in response to the output, power to be delivered to the authentication sensor.

3. The gun of claim 2, wherein the electronic component comprises a presence sensor, and wherein the transmitting the activation signal is further based on determining that the output generated by the electronic component satisfies a threshold value.

4. The gun of claim 3, wherein the output generated by the electronic component indicates a capacitance value, a light value, a pressure value, or any combination thereof.

5. The gun of claim 2, wherein the electronic component comprises a button, and wherein the transmitting the activation signal is further based on determining that the button is configured to cause the gun to transition states.

6. The gun of claim 2, wherein the electronic component comprises a timer, and wherein the transmitting the activation signal is further based on determining that the timer is configured as a sleep timer.

7. The gun of claim 2, wherein the controller is further configured to:
identify a user absence event based on the electronic component generating an output indicating that a user is not grasping the gun;
initiate, based on the user absence event, a standby timer for a predetermined amount of time; and
cause, in response to expiration of the standby timer, the processor to transition to the inactive state.

8. The gun of claim 2, wherein, while in the inactive state, a current drawn by the processor is less than a threshold.

9. The gun of claim 8, wherein the threshold is between 50 microamperes and 1 milliampere.

10. A gun comprising:
an energy store configured to store electric charge;
a processor that is electronically coupled with the energy store, wherein the processor is configured to transition between an active state and an inactive state, wherein the processor is configured execute a set of instructions to analyze data generated by an authentication sensor of the gun while in the active state;
a presence sensor that is electronically coupled with the processor, wherein the presence sensor is configured to generate an output that can be used to determine whether a user is holding the gun; and
means for causing the processor to transition states, wherein the means for causing the processor to transition states is configured to cause the processor to transition to the active state based on the presence sensor generating the output, and wherein the means for causing the processor to transition states is further configured to cause power to be delivered to the authentication sensor based on the presence sensor generating the output.

11. The gun of claim 10, further comprising:
a real-time clock, wherein the means for causing the processor to transition states is further configured to:
set a sleep timer using the real-time clock, and wherein the means for causing the processor to transition states is further configured to cause the processor to transition to the active state based on expiration of the sleep timer.

12. The gun of claim 10, wherein the means for causing the processor to transition states is further configured to:
determine that the output satisfies a threshold value; and
generate, in response to the determining that the output satisfies the threshold value, an interrupt signal designed to cause the processor to transition to the active state.

13. The gun of claim 12, wherein the threshold value comprises a capacitance threshold, a pressure threshold, a light threshold, a magnetic flux threshold, or any combination thereof.

14. The gun of claim 12, wherein the output satisfying the threshold value indicates that a user is grasping the gun.

15. The gun of claim 10, wherein the means for causing the processor to transition states is further configured to:
identify a user absence event based on the presence sensor generating an output indicating that a user is not grasping the gun;
initiate, based on the user absence event, a standby timer for a predetermined amount of time; and
cause, in response to expiration of the standby timer, the processor to transition to the inactive state.

16. The gun of claim 10, wherein the means for causing the processor to transition states is further configured to:
identify a user absence event based on the presence sensor generating an output indicating that a user is not grasping the gun; and determine, in response to the user absence event, (i) an amount of electric charge remaining in the energy store, and (ii) an estimated time duration based on the amount of electric charge, wherein the means for causing the processor to transition states is configured to cause the processor to transition to the inactive state, in which a current drawn by the gun is less than a threshold, for no longer than the estimated time duration.

17. The gun of claim 10, wherein a current drawn by the gun is less than a threshold current while in the inactive state.

18. The gun of claim 17, wherein the threshold current is 250 microamperes.

* * * * *